(12) United States Patent
Yamamoto

(10) Patent No.: US 10,834,195 B2
(45) Date of Patent: Nov. 10, 2020

(54) INFORMATION PROCESSING DEVICE, INFORMATION PROCESSING METHOD, PROGRAM, AND STORAGE MEDIUM

(71) Applicant: Rakuten, Inc., Tokyo (JP)

(72) Inventor: Yoji Yamamoto, Tokyo (JP)

(73) Assignee: Rakuten, Inc., Tokyo (JP)

( * ) Notice: Subject to any disclaimer, the term of this patent is extended or adjusted under 35 U.S.C. 154(b) by 27 days.

(21) Appl. No.: 16/343,459

(22) PCT Filed: Oct. 20, 2016

(86) PCT No.: PCT/JP2016/081142
§ 371 (c)(1),
(2) Date: Apr. 19, 2019

(87) PCT Pub. No.: WO2018/073940
PCT Pub. Date: Apr. 26, 2018

(65) Prior Publication Data
US 2019/0245925 A1    Aug. 8, 2019

(51) Int. Cl.
*H04L 29/08* (2006.01)
*G06F 16/958* (2019.01)
*G06F 12/00* (2006.01)

(52) U.S. Cl.
CPC .......... *H04L 67/1097* (2013.01); *G06F 12/00* (2013.01); *G06F 16/958* (2019.01)

(58) Field of Classification Search
None
See application file for complete search history.

(56) References Cited

U.S. PATENT DOCUMENTS

| 2011/0138270 A1* | 6/2011 | Li ............................ G06F 40/14 |
| | | 715/242 |
| 2016/0371293 A1* | 12/2016 | Luna ........................ H03M 7/30 |
| 2018/0005500 A1* | 1/2018 | Robertson .......... G06K 9/00369 |
| 2018/0146059 A1* | 5/2018 | Schoenberg .......... H04L 47/286 |

FOREIGN PATENT DOCUMENTS

| JP | 2002-132546 A | 5/2002 |
| JP | 2007-328750 A | 12/2007 |
| JP | 2008-176616 A | 7/2008 |
| JP | 2010-044468 A | 2/2010 |

OTHER PUBLICATIONS

International Search Report for PCT/JP2016/081142, dated Jan. 10, 2017.
International Search Report for PCT/JP2016/081143, dated Jan. 10, 2017.
International Search Report for PCT/JP2016/081144, dated Jan. 10, 2017.

* cited by examiner

*Primary Examiner* — Natisha D Cox
(74) *Attorney, Agent, or Firm* — Sughrue Mion, PLLC

(57) ABSTRACT

An information processing device obtains a popularity degree index of a blog which contains at least one article, sets a threshold for determining whether or not to compress each blog in accordance with the popularity degree index for each blog, determines whether or not the blog is a blog to be compressed based on a total data amount of the at least one article contained in the blog and on the threshold, and determines an article to be compressed among the at least one article contained in the blog to be compressed. At least a part of the article contained in the blog to be compressed is to be compressed.

9 Claims, 18 Drawing Sheets

FIG. 4

MANAGING DB 53

| BLOG ID | USER INFORMATION | BLOG MANAGING INFORMATION | BLOG ACTUAL-ACHIEVEMENT INFORMATION | SIZE INFORMATION | DETERMINATION INFORMATION | COMPRESSION AND DECOMPRESSION INFORMATION | COMPRESSED ARTICLE TAG |
|---|---|---|---|---|---|---|---|
| ... | ... | ... | ... | ... | ... | ... | ... |

- DELETE DECOMPRESSED ARTICLE — S310
- END

- COMBINE DECOMPRESSED ARTICLE IN BLOG AND STORE — S320
- DELETE COMPRESSED ARTICLE — S321
- UPDATE COMPRESSION AND DECOMPRESSION INFORMATION — S322
- END

- LINK DECOMPRESSED ARTICLE WITH BLOG AND STORE — S330
- UPDATE COMPRESSION AND DECOMPRESSION INFORMATION — S331
- END

INFORMATION PROCESSING DEVICE, INFORMATION PROCESSING METHOD, PROGRAM, AND STORAGE MEDIUM

CROSS REFERENCE TO RELATED APPLICATIONS

This application is a National Stage of International Application No. PCT/JP2016/081142 filed Oct. 20, 2016.

TECHNICAL FIELD

The present disclosure relates to an information processing device, an information processing method, a program, and a storage medium, and more specifically, to technologies suitably applicable to a server device that manages a blog.

BACKGROUND ART

An example known service utilizing the Internet is a service that provides a blog environment. A user uploads an article that contains arbitrary sentences and images as a blog to a server, and the uploaded information is stored as a written article of the user. The stored blog is opened to the public in the form of, generally, a webpage. Moreover, the range to be opened to the public may be limited, or the blog is not opened to the public at all, and the like.

Many users utilize such a blog service as a tool for an own information dispatch, or as an alternative for a private diary.

Patent Literature 1 discloses a technology relating to a blog, e.g., a technology relating to an upload of an article.

Patent Literature 2 discloses a technology relating to a contents deletion in accordance with the insufficient remaining capacity of a server.

CITATION LIST

Patent Literatures

Patent Literature 1: JP 2007-328750 A
Patent Literature 2: JP 2010-44468 A

SUMMARY OF INVENTION

Technical Problem

Many blogs can be launched at no charge, and there are users who tentatively launch a blog but hardly update. In contrast, there are users who frequently update the articles and gain in popularity. Hence, there are various types of users. Accordingly, the number of accesses for each blog and for individual article varies broadly.

A blog such that several articles are updated after the blog has been launched, but not updated afterward and left as it is for a long time without any access, and the user who has launched the blog does not login may be unnecessary for the user. Such a blog wastes, in particular, a storage resource of a service provider that provides the blog service.

Hence, a blog and articles that have a low accessibility may be compressed, and may be decompressed and distributed when an access is made.

However, compressing and decompressing processes have a high process load. The necessity of a decompression of the article when an access is made may decrease a performance possibly at the time of viewing such that a viewing user feels a slow response of a webpage due to such a process time. In view of the foregoing, it is preferable to reduce the number of compressing and decompressing processes as much as possible at the time of viewing.

Therefore, an objective of the present disclosure is to accomplish an effective utilization of a storage resource while avoiding a decompressing process at the time of viewing as much as possible by an appropriate selectin of an article to be compressed.

Solution to Problem

An information processing device according to the present disclosure includes: a popularity degree index obtaining unit that obtains a popularity degree index of a blog which contains one or a plurality of articles; a threshold setting unit that sets a threshold for determining whether or not to compress each blog in accordance with the popularity degree index for each blog; and a determining unit which determines whether or not the blog is a blog to be compressed based on a total data amount of the articles contained in the blog and on the threshold, at least a part of the article contained in the blog to be compressed being to be compressed, and which determines an article to be compressed among the articles contained in the blog to be compressed.

When the resource for storing the blog becomes tight because of the articles contained in the blog, the articles that belong to the blog may be compressed. In this case, the threshold for determining whether or not to compress is decided based on the popularity degree index for each blog.

The above-described information processing device may further include a compressing and decompressing unit which compresses the article to be compressed among the articles that belong to the blog to be compressed, and which decompresses the article when an access request is made to the article that has been already compressed.

This compressing and decompressing unit compresses the appropriate article selected in accordance with the determination by the determining unit. Moreover, even if the article is compressed as being determined that the accessibility is low, an access request thereto may sometimes occur. In this case, execution of the decompressing process appropriately provides the article to the accessing user.

In the above-described information processing device, the determining unit may determine, for each article, whether or not the article is to be compressed in accordance with a degree of an accessibility for each article contained in the blog to be compressed.

When any of the articles that belong to the blog is compressed, which article is to be compressed may be selected. According to this structure, the determination is made in accordance with the accessibility for each article.

In the above-described information processing device, the determining unit may determine that, when the already-compressed article is decompressed in accordance with an access request, the article is not to be compressed for a predetermined time period from the decompression.

That is, the article that is decompressed when an access is made is being in a decompressed status for the predetermined time period.

In the above-described information processing device: the determining unit may determine, for the already-compressed article, whether or not to decompress in accordance with a value that indicates an increasing tendency of a page view to the other article in the same blog to be compressed; and the compressing and decompressing unit may decompress the article in accordance with the determination on whether or not to decompress.

When a given blog has the number of accesses keenly increased because of a certain popular article, the other article contained in this blog has the increasing possibility such as to be accessed in future even if not accessed so far. Hence, the determination to decompress is made.

In the above-described information processing device, the determining unit may determine whether or not to decompress the already-compressed article based on contents of the article.

For example, as the contents of the compressed article, an article that contains a certain set keyword or a current-news word, an article for a specific theme, etc., are picked out, and those articles are to be decompressed.

In the above-described information processing device, the popularity degree index may be a value obtained based on at least one of the followings: a total number of page views for the entire blog; a number of page views for each article; a number of unique users who have accessed the blog; a total linked number set for the blog; a total number of comments posted on the blog; a number of unique users who have posted comments on the blog; a value that indicates a page ranking of the blog; a length of a time period at which there is no access request to the blog; a total number of page views for the entire blog within a predetermined time period; a value that indicates an increasing tendency of the page views for the entire blog; a value that indicates a blog updating frequency (an article posting frequency); a number of clicks to an advertisement provided on the blog page; and a value that indicates an increasing tendency of the data amount for the entire blog.

These values are likely to be values in accordance with the popularity for each blog.

An information processing method according to the present disclosure includes: a popularity degree index obtaining step of obtaining a popularity degree index of a blog which contains one or a plurality of articles;

a threshold setting step of setting a threshold for determining whether or not to compress each blog in accordance with the popularity degree index for each blog; and a determining step of determining whether or not the blog is a blog to be compressed based on a total data amount of the articles contained in the blog and on the threshold, at least a part of the article contained in the blog to be compressed being to be compressed, and of determining an article to be compressed among the articles contained in the blog to be compressed.

This information processing method enables the information processing device to determine an appropriate article to be compressed.

A program according to the present disclosure is a program that causes an information processing device to execute procedures corresponding to the above-described steps. A storage medium according to the present disclosure has stored therein the program. Those accomplishes the above-described processes of the information processing device.

Advantageous Effects of Invention

According to the present disclosure, since an appropriate article to be compressed is selectable, effective utilization of a storage resource is accomplished while avoiding a decompressing process at the time of viewing as much as possible.

BRIEF DESCRIPTION OF DRAWINGS

FIG. 4 is an explanatory diagram for a managing database according to the embodiment;

DESCRIPTION OF EMBODIMENTS

Embodiments will be described below in the following sequence.
<1. System Configuration>
<2. Blog Server and Database>
<3. First Embodiment>
<4. Second Embodiment>
<5. Third Embodiment>
<6. Fourth Embodiment>
<7. Fifth Embodiment>
<8. Sixth Embodiment>
<9. Seventh Embodiment>
<10. Eighth Embodiment>
<11. Summary and Modified Example>
<12. Program and Storage Medium>

Note that, in the following description, a term "blog" means a webpage in the form of a diary called a weblog or simply a blog. More specifically, a blog server provides an environment (a storage capacity and a webpage) for forming a blog to a user, and the user uploads, in the form of posting, etc., an article that contains sentences and images to the own blog. A blog server normally provides such an article for a public (or limited range) viewing. However, the blog may be not opened to the public.

The contents of the article are not limited to any particular information. It may be information utilized for the user to information dispatch, or may be a private diary, etc. Moreover, equivalent contents although not called a "blog" are also treated as a blog.

The term "article" is an element which constitutes a blog, and indicates a unit (e.g., a posted unit) formed by sentences and images. The contents thereof are not limited to any particular information. Moreover, the article may be not only a single topic but also a group of articles to be viewed by a single URL for one or a plurality of topics.

Regarding the term "user", a user as a describer who writes an article in the own blog (a so-called blogger), and a user as an audience who views the other person's or own blog are expected. Those users are distinguished and referred to as the "describer" and the "audience". Needless to say, it is normally expected that a user may be a describer at a given time point but may become an audience at another time point.

A term "compression" means a so-called data compression, and is to convert various data, such as text data and image data, into another data that has decreased data amount while maintaining the substantial characteristics of the data.

A term "decompression" is to return the compressed data to the status before the compression. However, a case in which data does not completely return to the status before the compression like a case in which a so-called lossy compression is executed at the time of the compression is also involved. In this specification, an action to make at least the contents of the article viewable is called the "decompression".

1. System Configuration

Figure 1:
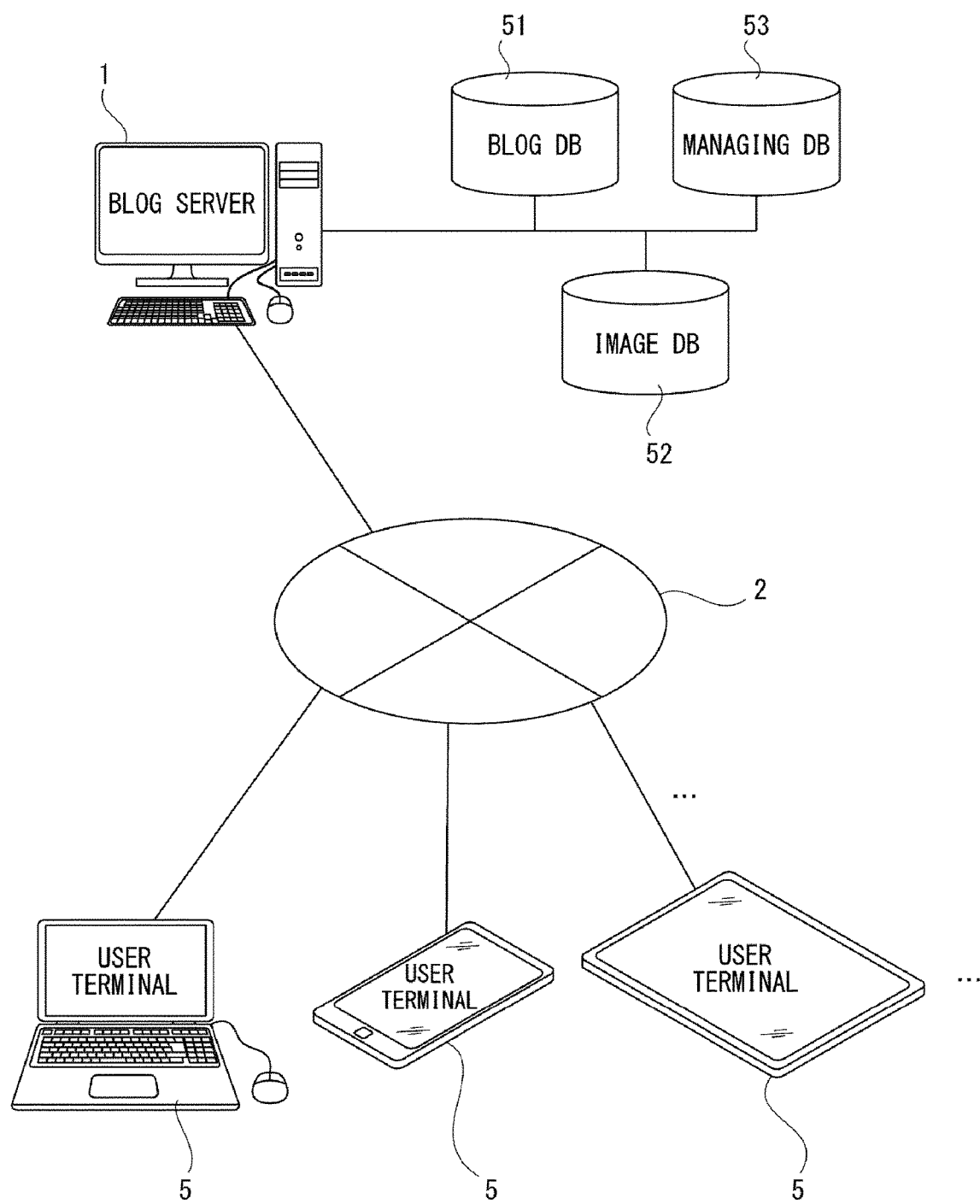
FIG. 1 is an explanatory diagram for a network that includes a blog server according to an embodiment of the present disclosure.

FIG. 1 illustrates an example structure of a network system that includes a blog server 1 according to an embodiment.

According to the network system of this embodiment, a blog server 1 and a plurality of user terminals 5 are connected together so as to be mutually communicable via a network 2.

Moreover, the blog server 1 is accessible to various databases. Note that the term "database" will be referred to as "DB" below. In the figure, a blog DB 51, an image DB 52, and a managing DB 53 are illustrated as the DBs to which the blog server 1 is accessible.

Regarding the structure of the network 2, various structures are expectable. For example, the Internet, an intranet, an extra network, a Local Area Network (LAN), a Community Antenna TeleVision (CATV) communication network, a Virtual Private Network (VPN), a telephone network, a mobile communication network, a satellite communication network, etc., are expectable.

Moreover, regarding a transmission medium that constitutes all of or a part of the network 2, various examples are also expectable. For example, wired schemes, such as Institute of Electrical and Electronics Engineers (IEEE) 1394, a Universal Serial Bus (USB), a power line transmission or a telephone line, or, wireless schemes, such as infrared ray like Infrared Data Association (IrDA), Bluetooth (registered trademark), 802.11 wireless communication, a mobile phone network, a satellite connection, or a terrestrial digital network, are applicable.

The blog server 1 is an information processing device utilized by an organization that manages and runs the blog service for the users. The blog server 1 provides a blog environment to the user (describer) and distributes webpage data like a blog article page to the user (audience) in response to an access request.

More specifically, for the describer who wants to open a blog, a webpage as the describer's blog is set, and user information is registered, and the like. For the describer who has already launched the blog, the article posted by the describer is stored.

Moreover, in response to the access request from the user who is a general audience, the webpage data corresponding to the related webpage is distributed.

This blog server 1 is equivalent to an embodiment of the information processing device as recited in the claims.

The user terminal 5 is a terminal utilized by the user as the describer or the audience. An example user terminal 5 is a Personal Computer (PC) with a communication function, a feature phone, a Personal Digital Assistant (PDA) or a smart device, such as a smartphone or a tablet terminal.

The user terminal 5 executes various kinds of transmitting and receiving processes, display processes, etc., as needed.

The audience is capable of arbitrarily viewing the interesting blog via a web browser on the user terminal 5.

The describer is capable of accessing and viewing the own blog page, and posting a new article via the user terminal 5.

The user terminal 5 is to execute a communicating process, a display process, etc., for these operations.

Figure 2:
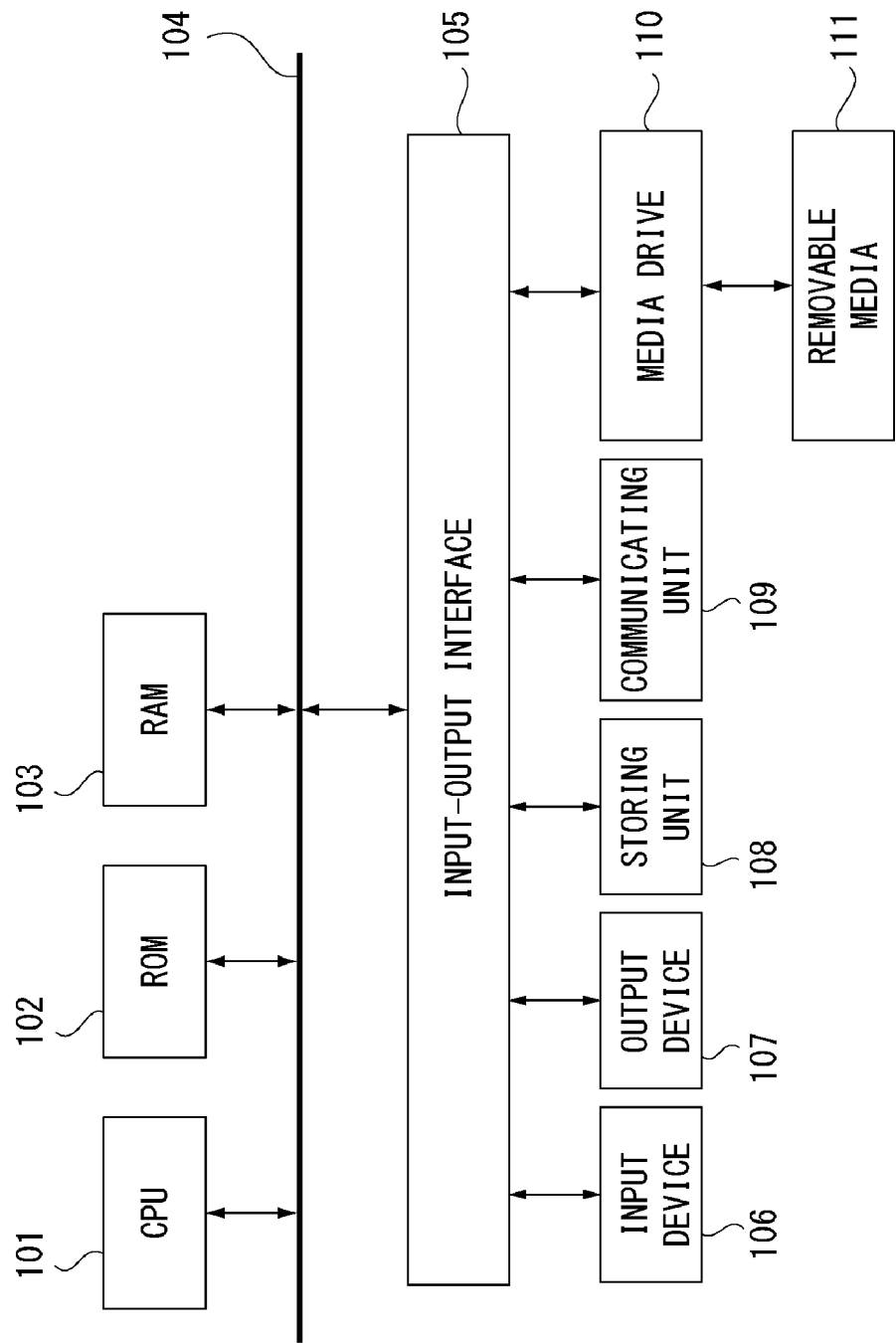
FIG. 2 is a block diagram of a computer apparatus that can be utilized in the embodiment.

FIG. 2 illustrates a hardware configuration of the information processing device that constructs the blog server 1 or the user terminal 5 as illustrated in FIG. 1. Each device illustrated as the blog server 1 or the user terminal 5 is achieved by a computer apparatus as illustrated in FIG. 2 and the computer apparatus is capable of an information processing and information communication.

In FIG. 2, a Central Processing Unit (CPU) 101 of the computer apparatus executes various kinds of processes in accordance with a program stored in a Read-Only Memory (ROM) 102 or a program loaded in a Random Access Memory (RAM) 103 from the storing unit 108. The RAM 103 also stores, as needed, necessary data, etc., for the CPU 101 to execute various kinds of processes.

The CPU 101, the ROM 102, and the RAM 103 are mutually connected with each other via a bus 104. An input-output interface 105 is also connected to this bus 104.

An input device 106, an output device 107, the storing unit 108, and a communicating unit 109 are connected to the input-output interface 105.

The input device 106 includes, for example, a keyboard, a mouse, and a touch panel.

The output device 107 includes, for example, a display, such as a Liquid Crystal Display (LCD), a Cathode Ray Tube (CRT), an organic ElectroLuminescence (EL) panel, and a speaker.

The storing unit 108 includes, for example, a Hard Disk Drive (HDD), or a flash memory device.

The communicating unit 109 executes a communicating process and a device-to-device communication via the network 2.

A media drive 110 is also connected to the input-output interface 105, as needed. A removable medium 111, such as a magnetic disk, an optical disk, a magneto-optical disc, or a semiconductor memory, is loaded as needed, and information is written or read relative to the removable medium 111.

According to such a computer apparatus, data and programs are uploaded or downloaded via the communication by the communicating unit 109. Moreover, data and programs can be exchanged via the removable medium 111.

The CPU 101 that executes processing operations in accordance with the various programs achieves execution of necessary information processing and communication as the blog server 1 or as the user terminal 5.

Note that the information processing device that constitutes the blog server 1 or the user terminal 5 is not limited to a structure constructed by a single computer apparatus as illustrated in FIG. 2, but may employ a structure in which a plurality of computer apparatuses constructs a system. The plurality of computer apparatuses may construct a system via a LAN, etc., or may be placed at remote sites via a VPN, etc., that utilizes the Internet. The plurality of information processing devices may include a group of servers (cloud) that is available by cloud computing service.

2. Blog Server and Database

Figure 3:
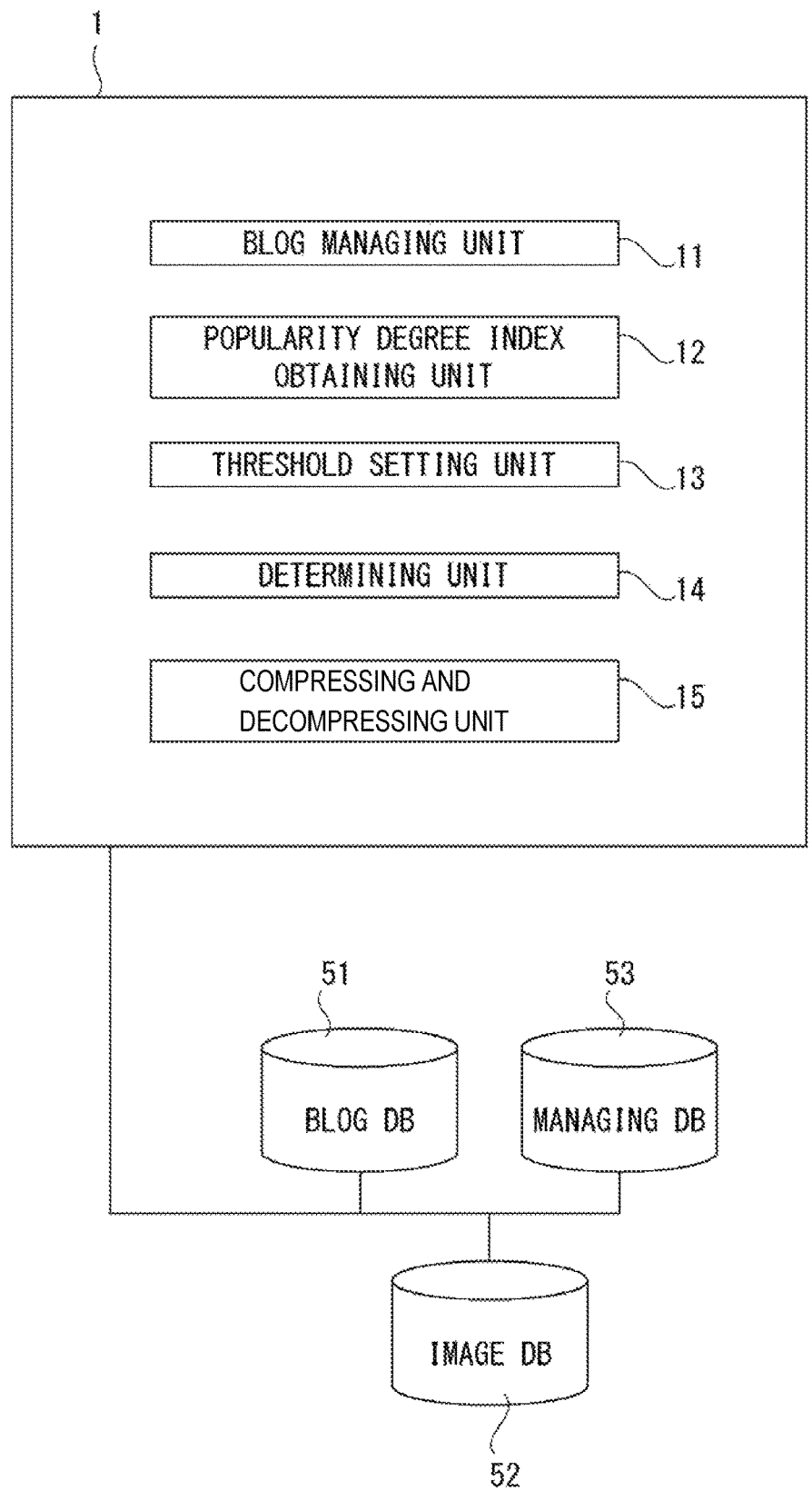
FIG. 3 is an explanatory diagram for a functional configuration of the blog server according to the embodiment.

FIG. 3 illustrates a functional configuration of the blog server 1 constructed by the one or plurality of information processing devices, and various kinds of DBs.

Each function as the blog server 1 is achieved by the process executed by the CPU 101 in the information processing device in accordance with the program. However, all of or a part of a process by each structure to be described below may be achieved by hardware.

Moreover, when each function is achieved by a software, it is unnecessary that each function is achieved by individual program. A single program may execute a plurality of functional processes, or a single function may be achieved by a cooperative operation by a plurality of program modules.

Moreover, each function may be distributed to the plurality of information processing devices. Furthermore, a single function may be achieved by the plurality of information processing devices.

As illustrated in the figure, the blog server 1 includes functions as a blog managing unit 11, a popularity degree index obtaining unit 12, a threshold setting unit 13, a determining unit 14, and a compressing and decompressing unit 15.

The blog managing unit 11 executes necessary processes as a server that provides the blog service. For example, this unit provides the blog environment to the user, manages information on the user as the describer, stores and manages the created blog, manages information on each blog, and distributes the webpage of the blog (article) in accordance with the access request, and the like.

Moreover, the blog managing unit 11 updates and reads the information in the managing DB 53 as needed.

When determining whether or not to compress the article in the blog, the popularity degree index obtaining unit 12 executes a process of obtaining the popularity degree index which indicates the popularity degree of the blog as information utilized for the determination. In the process of obtaining the popularity degree index, a value itself that indicates a popularity degree index may be obtained, or the popularity degree index may be obtained through calculation based on a plurality of indexes.

The popularity degree index for the blog is calculated based on one or a plurality of the following values: the total number of page views for the entire blog; the number of page views for each article; the number of unique users who have accessed the blog; the total linked number set for the blog; the total number of comments posted on the blog; the number of unique users who have posted comments on the blog; the value that indicates the page ranking of the blog; the length of a time period at which there is no access request to the blog; the total number of page views for the entire blog within a predetermined time period; the value that indicates the increasing tendency of page views for the entire blog; the value that indicates the blog updating frequency; the number of clicks to an advertisement provided on the blog page; and the value that indicates the increasing tendency of the data amount for the entire blog, etc.

For example, the popularity degree index may be calculated based on the total number of page views for the entire blog, or may be calculated in view of the total number of comments posted on the blog in addition to the total number of page views for the entire blog.

The threshold setting unit 13 executes, for each blog, a process of setting a threshold for determining whether or not the blog should be set as a blog to be compressed in which at least some articles contained in the blog are compressed (the details will be described later).

Regarding the setting of the threshold, the popularity degree index obtained by the popularity degree index obtaining unit 12 is utilized. A setting is made for the blog in such a way that the higher the popularity degree index is (i.e., the higher the popularity is), the higher the threshold is to be set, thereby decreasing the necessity of the compressing process and also the decompressing process.

Note that in the following description, the above-described threshold will be referred to as the "to-be-compressed-blog determining threshold."

The determining unit 14 executes a process of determining whether or not to compress the article contained in the blog based on the to-be-compressed-blog determining threshold. In other words, a process of determining whether or not the blog is the blog to be compressed. The determining unit 14 also determines whether or not to compress for each article contained in the blog when determining that the blog is to be compressed.

Moreover, the determining unit 14 executes, for the compressed article, a process of determining whether or not to decompress based on the popularity degree index, a process of determining whether or not to decompress based on the contents, and a process of determining whether or not to decompress based on the popularity tendency of the blog, and the like.

A specific example will be described later as a process in each embodiment.

The compressing and decompressing unit 15 executes a process of compressing the article determined as to be compressed by the determining unit 14.

Moreover, the compressing and decompressing unit 15 executes adecompressing process to the compression when the access request is made to the already-compressed article.

Furthermore, the compressing and decompressing unit 15 executes a process of decompressing the already-compressed article determined as to be decompressed by the determining unit 14.

Upon the execution of the compressing process on the article, the blog that does not need a further compressing process on the article is no longer the blog to be compressed.

FIG. 3 illustrates the blog DB 51, the image DB 52, and the managing DB 53 that are DBs to which the blog server 1 accesses.

The blog DB 51 stores the blog data for each describer as webpage data. Regarding each blog, the article is added in accordance with the describer's posting.

The data on the webpage that forms the blog is structured document files, such as HyperText Markup Language (HTML) and Extensible HyperText Markup Language (XHTML). Described in the structured document files are text data for the article posted by the describer, specifying information for image data on various images, the layout thereof, and the display scheme thereof (e.g., a letter color, a font, a size, and a decoration).

Moreover, the audience can also post a comment to the blog. Data on such a comment from such an audience is also stored in the blog DB 51 in association with the blog and each article therein.

When there is the access request to a certain blog from the user terminal 5, the blog server 1 reads the requested blog page from the blog DB 51, and distributes the read information to the user terminal 5.

The image DB 52 stores the image data (still image data or motion image data) attached to the blog.

Although an image can be attached to the article in the blog, for example, article data and specifying information (link information) on the image corresponding to the article data are stored in the blog DB 51. Moreover, the image data itself is stored in the image DB 52.

In the case of the access request to the blog article to which the image is attached, the webpage data is displayed by the browser on the user terminal 5, but at this time, the user terminal 5 requests the image data to the blog server 1 in accordance with the link setting on the webpage. The blog server 1 reads image data from the image DB 52 in accordance with the request, and distributes the image data to the user terminal 5. Hence, a blog article with the image is displayed on the user terminal 5.

Note that this is merely an example, and the webpage data that contains the image data in advance may be stored in the blog DB 51.

The managing DB 53 stores information for managing each blog.

An example of the details of managing DB 53 will be illustrated in FIG. 4.

A blog Identification (ID) is set for each blog, and the accompanying information is managed based on the blog ID. For example, user information, blog managing information, blog actual-achievement information, size information, determination information, compression and decompression information, a compressed article tag, etc., are updated and managed as needed for each blog (the blog ID).

The user information is information on the user (blog operator) as the describer who has launched the blog. For example, user information includes a user ID, a login password as the operator, attribute information, such as a user's address, a name and age, and information on a login date and time as the operator.

The blog managing information is the attribute information on the blog itself. For example, such information contains the Uniform Resource Locator (URL) of the blog, genre information on the blog, the blog launched date and time, the number of articles in the blog, update date and time information, layout information on the blog, and link setting information.

Regarding the blog actual-achievement information, information that indicates the popularity of the blog (the popularity degree index), and information that indicates an accessibility to each article are stored.

More specifically, regarding the entire blog, the total number of page views, the number of accessed unique users, the total linked number, the value that indicates the page ranking of the blog, the length of a time period at which there is no access request to the blog, the total number of page views for the entire blog within a predetermined time period, the value that indicates the increasing tendency of the page view for the entire blog, the value that indicates the blog update frequency, the number of clicks on the advertisement provided on the blog page, and the value that indicates the increasing tendency of the data amount for the entire blog, are stored and updated as needed.

Since these values become respective values in accordance with the popularity degree for each blog, those values are suitable for calculating the popularity degree index. Note that the calculated popularity degree index is also stored as the blog actual-achievement information.

Moreover, as the blog actual-achievement information for each article, the number of page views, the number of accessed unique users, the total linked number, the value that indicates the ranking of the article, the length of the time period at which there is no access request to the article, the number of page views for the article within a predetermined time period, the value that indicates the increasing tendency of the page view for the article, and the number of clicks to the advertisement provided on the article page, are stored and updated as needed.

Since these values become respective values in accordance with the accessibility for each article, those values are suitable for calculating the degree of accessibility (the accessibility index below). Note that the calculated accessibility index is also stored as the blog actual-achievement information.

The size information is information on the total data amount of the articles contained in the entire blog. Moreover, the size information on each article may be stored. The size information is updated in accordance with the update of the blog.

Note that the data amount stored in the blog DB 51 as the size information and the data amount of the image data stored in the image DB 52 may be collectively managed, or may be separately and individually managed.

The determination information is determination information on whether or not to set the blog as the blog to be compressed, and information on the determination for each article by the determining unit 14 for whether or not to compress based on the popularity degree index and other information. Moreover, information on the determination by the determining unit 14 for whether or not to decompress the compressed article is also included. That is, the determination information indicates whether or not to compress or whether or not to decompress. These pieces of information are updated as, for example, flag data.

The article that has stored information as information which is on whether or not to compress and which indicates to compress is the article subjected to the compressing process. Moreover, after the compressing process, the flag data is cleared, and information that indicates not to compress (i.e., a status not subjected to the compressing process) is overwritten.

In addition, the to-be-compressed-blog determining threshold is stored for each blog as the determination information.

The compression and decompression information indicates, for each article in the blog, an execution status of compression or decompression, such as original status, compressed status, or decompressed status from the compression. It is appropriate if the compression and decompression information is defined as status information to identify the status.

Moreover, the execution date and time of the compression or the decompression is also stored as past-record information on the compression or the decompression.

In the following description, the article in the original status will be referred to as the "uncompressed article", the article in the compressed status will be referred to as the "compressed article", and the article in the decompressed status from the compression will be referred to as the "decompressed article".

Note that the data on the decompressed article may be the same as the data on the uncompressed article, but since lossy compression is applied, the decompressed data may have a lower data quality than the original article data. That is, the data on the uncompressed article and the data on the decompressed article are not always exactly the same data. Hence, in order to distinguish the decompressed article data after the compression from the "uncompressed article", such an article will be referred to as the "decompressed article".

A compressed article tag is set in accordance with the contents for each article.

For example, a phrase like a keyword that appears in the article, a current-news phrase, and a genre of the article are set and registered as the tag. For example, when the compression is executed, the tag in accordance with the contents of the article is created, and is registered as the compressed article tag. The compressed article tag is utilized to estimate the contents in the compressed article without a decompression.

Each of the above-described DBs (the blog DB 51, the image DB 52, and managing DB 53) may be achieved in any form as long as the blog server 1 is accessible. For example, all of each DB may be formed in a storing unit within the same system as the blog server 1, or a part of or all of the respective DBs may be separately formed and provided in a computer system, for example, at a remote site. Needless to say, it is unnecessary that each DB is formed within the single device (e.g., a single HDD). Moreover, it is unnecessary that each DB is constructed as the single DB. For example, information stored as the managing DB 53 may be stored and managed by a plurality of DBs (e.g., a DB for managing a user relating to a blog, and a DB for managing the blog). Each of the above-described DBs are merely presented as an example in which the storing unit for the information relating to the process in the embodiment is constructed in the form of a single DB.

3. First Embodiment

An example process as a first embodiment which is executed by the blog server 1 will be described.

Presently, although a blog can be easily started by general users, there is a user who loses the interest after uploading several articles, or there is a user who maintains the interest for a long time. Moreover, there is a popular blog with many access requests, and there is a blog that has almost no audience.

It is necessary for the blog server 1 to maintain the blogs for those various users without prejudice, but because of this reason, the storage resource load is likely to become large.

Hence, according to this embodiment, the blog server 1 decides a blog and an article to be compressed based on the popularity degree index for each blog. Moreover, when there is an access request to the compressed article, the article is decompressed and distributed.

However, since the compressing process and the decompressing process also need a certain process load, it is desirable not to execute such processes so frequently. Moreover, decompression of the compressed article and distribution of such an article increase a response time together with the process load, and thus there is a possibility such that the user feels a reduction in performance. Hence, it is desirable to avoid an access request to the compressed article as much as possible.

Hence, according to this embodiment, the article that has a low accessibility is appropriately selected among the articles belonging to the blog to be compressed, and is set as the article to be compressed.

Figure 5:
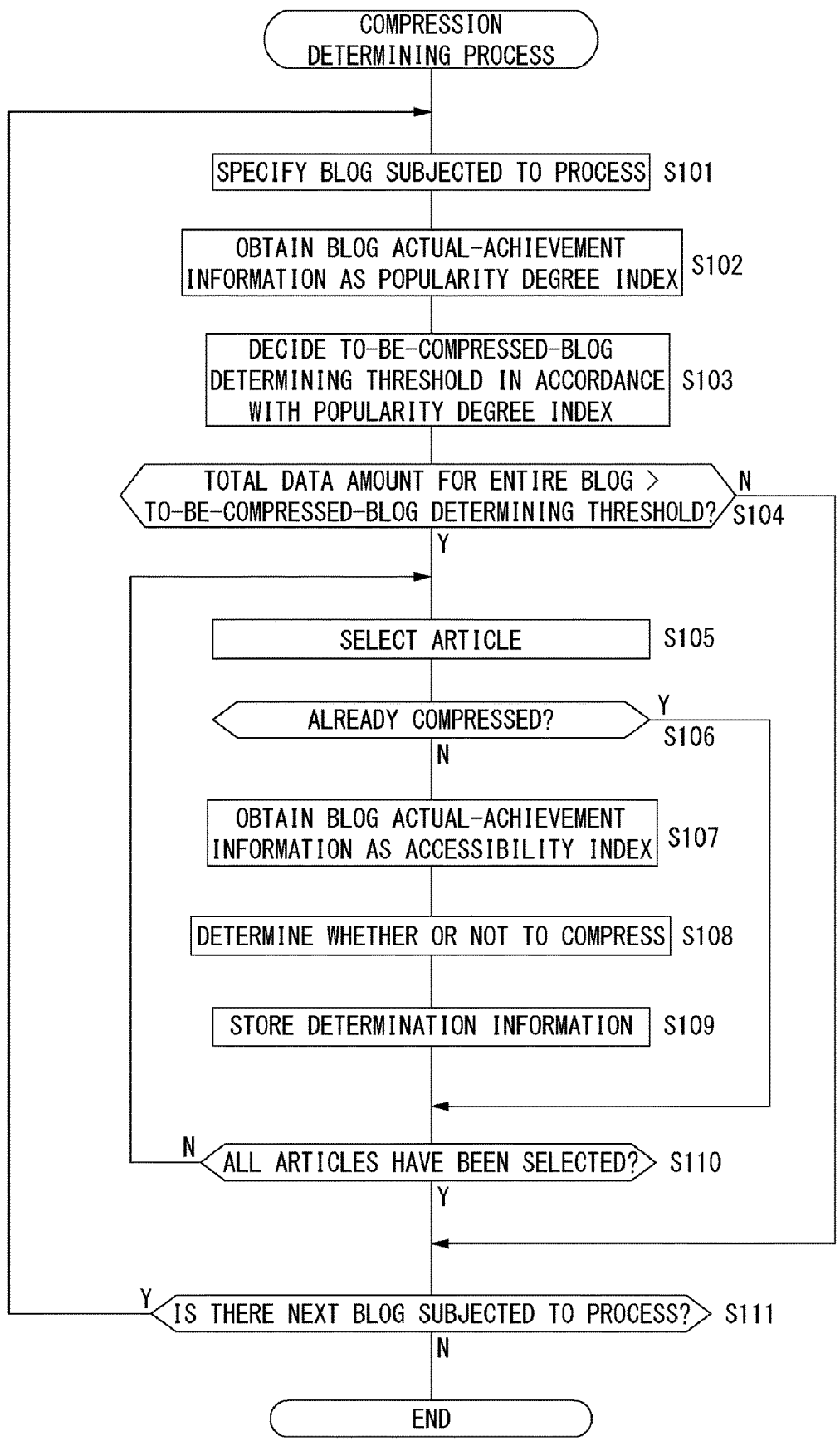
FIG. 5 is a flowchart of a compression determining process according to a first embodiment.

FIG. 5 illustrates an example compression determining process executed by the blog server 1. According to the compression determining process, the blog to be compressed is determined, and the article to be compressed is determined among the articles contained in the blog to be compressed.

Note that according to this example, a value (the index) in the blog actual-achievement information is directly utilized as the popularity degree index. Moreover, regarding the accessibility index for each article, a value in the blog actual-achievement information is directly utilized as the accessibility index.

Respective processes illustrated by the flowcharts from FIG. 5 and up to FIG. 18 to be described later are processes executed by the functions of the blog server 1 which are the blog managing unit 11, the popularity degree index obtaining unit 12, the threshold setting unit 13, the determining unit 14, and the compressing and decompressing unit 15 as illustrated in FIG. 3.

The blog server 1 executes the compression determining process in FIG. 5 as needed on all of or some blogs stored in the blog DB 51. This is a process of determining the blog subjected to the compression at this time as the blog to be compressed, and of determining which article among the articles contained in this blog is set as the article to be compressed.

First, the blog server 1 specifies, in step S101, one blog subjected to the compression determining process. For example, one blog may be selected in accordance with the sequence of the blog IDs.

The blog server 1 obtains, in step S102, the popularity degree index for the blog specified as the blog subjected to the process. In this example, this is a process of obtaining a piece of information to be adopted as the popularity degree index among the information stored in the managing DB 53 as the blog actual-achievement information. More specifically, a piece of information to be adopted as the popularity degree index is selected and obtained among the number of page views, the number of accessed unique users, the total linked number, the value that indicates the page ranking of the blog, the length of a time period at which there is no access request to the blog, the total number of page views for the entire blog within a predetermined time period, the value that indicates an increasing tendency of the page view for the entire blog, the value that indicates the blog update frequency, the number of clicks to the advertisement provided on the blog page, and the value that indicates an increasing tendency of the data amount for the entire blog, etc.

Note that since the popularity degree index indicates a relative popularity degree to other blogs, it is not preferable to obtain a different index for each blog. That is, when the total number of page views of the blog is adopted as the popularity degree index, the total number of page views for each blog is obtained even if the popularity degree index for any blog is to be obtained.

Next, the blog server 1 executes, in step S103, a process of deciding the to-be-compressed-blog determining threshold in accordance with the popularity degree index.

When, for example, the total data amount of the blog allocated to the describer per a person is 2 Giga Byte (GB), the to-be-compressed-blog determining threshold is set to be a value that is smaller than 2 GB. As an example, the to-be-compressed-blog determining threshold is decided like 1.7 GB/1.5 GB/1.2 GB based on high/middle/low of the popularity degree index.

An example in which the popularity degree index is classified into high/middle/low will be described.

For example, the total number of page views of the blog is adopted as the popularity degree index: and when the total number of page views is 0 to 10000=the popularity degree index is low;

when the total number of the page views is 10001 to 1000000=the popularity degree index is middle; and when the total number of page views is equal to or greater than 1000001=the popularity degree index is high.

In this case, the blog that has the total number of page views which is 50000 is determined as having the middle popularity degree index, and the to-be-compressed-blog determining threshold is set to be 1.5 GB.

Note that the to-be-compressed-blog determining threshold that is classified into three classes in accordance with the popularity degree index is merely an example, and may be classified into two classes or may be classified into equal to or greater than four classes.

As an example in which the to-be-compressed-blog determining threshold is classified into equal to or greater than four classes, an example in which a formula is utilized will be described.

When, for example, there is a blog that has the maximum total number of page views among all the blogs is 100000 (=the maximum of the popularity degree index is 100000), and the blog subjected to the process at this time has the total number of page views that is 30000 (=the popularity degree index is 30000), a calculation may be made such that to-be-compressed-blog determining threshold=1.2 GB+ (30000/100000×0.5 GB)=1.35 GB. According to this formula, the to-be-compressed-blog determining threshold for the blog that has the popularity degree index=100000 is 1.7 GB, and the to-be-compressed-blog determining threshold for the blog that has the popularity degree index=00000 is 1.2 GB. That is, the to-be-compressed-blog determining threshold is finely set in accordance with the popularity degree index. Note that in this case, it is unnecessity to classify the popularity degree index into three classes that are high/middle/low, etc.

Moreover, the to-be-compressed-blog determining threshold may be calculated in view of the distribution of the popularity degree indexes of all the blogs, and may be calculated based on only the popularity degree index of the blog subjected to the process.

Subsequently, the blog server 1 executes, in step S104, a process of determining whether or not the total data amount in the blog subjected to the process exceeds the to-be-compressed-blog determining threshold.

When the total data amount in the blog does not exceed the to-be-compressed-blog determining threshold, the blog server 1 transitions the process to a process in step S111 to be described later.

In contrast, when the total data amount in the blog exceeds the to-be-compressed-blog determining threshold, the blog server 1 determines that the blog subjected to the process is the blog to be compressed, stores the determination result as the determination information in the managing DB 53, and then executes respective processes in steps S105 to S110 so as to determine whether or not to compress each article in the blog.

The blog server 1 selects, in the step S105, one article in the blog.

The blog server 1 checks, in the step S106, whether or not the selected article has been already compressed. This can be carried out by referring to, for example, the compression and decompression information in the managing DB 53.

When the article has been already compressed, since the determination on whether or not to compress this article is unnecessary, the process progresses to step S110. If it is checked in the step S110 whether or not the process has been completed for all the articles, and when not completed, the process returns to the step S105 and selects the next article.

Note that all the articles in the step S110 mean all the articles subjected to the process at this time. It may be all the articles in the blog, or may be some articles (e.g., the article posted in a specific time period) in the blog.

When the article selected as the article subjected to the process in the step S105 is the article that has not been compressed yet, the blog server 1 progresses the process to the step S107 from the step S106, and obtains the blog actual-achievement information that is the accessibility index for this article. The obtainment of the accessibility index in this example is a process of obtaining a piece of information adopted as the accessibility index from the information stored in the managing DB 53 as the blog actual-achievement information. More specifically, a piece of information to be adopted as the accessibility index is selected and obtained among the number of page views for the article, the number of accessed unique users, the total linked number, the value that indicates the ranking of the article, the length of a time period at which there is no access request to the article, the number of page views for the article within a predetermined time period, the value that indicates an increasing tendency of the page views for the article, and the number of clicks to the advertisement provided on the article page, etc., all stored in the managing DB 53.

Note that regarding the accessibility index, it is desirable to obtain the same index for each article like the popularity degree index.

Subsequently, the blog server 1 determines, in the step S108, whether or not to compress the article based on the accessibility index. That is, when the accessibility is high, the article is determined as not to be compressed, and when the accessibility is low, the article is determined as the article that can be compressed (or as the article that should be compressed).

When, for example, the length of a time period at which there is no access request to the article is selected as the accessibility index, a determination is made on whether or not such a time period is equal to or longer than three years, and the article that has no access request for equal to or longer than three years is determined as the article to be compressed due to the low accessibility. Note that the value three years (a threshold for the determination) is merely an example. This value may be changed for each describer, and may be the uniform and same value. When the value is changed for each describer, it is desirable to decide in view of the distribution of the accessibility indexes of the respective articles belonging to the blog subjected to the process. That is, in the case of the blog that has many articles which have the low accessibility indexes, the above threshold for the determination "three years" may be extended to "five years". Moreover, in the case of the blog that has many articles which have the high accessibility indexes, the above threshold for the determination "three years" may be shortened to "one year".

As described above, after the blog to be compressed is determined in consideration of the popularity degree index of the blog in the steps S103 and S104, the determination on whether or not to compress is made in the steps S107 and S108 in consideration of the accessibility index.

This enables a determination on whether or not to compress the article that is not accessed frequently in consideration of the popularity of the blog itself.

For example, with a time period at which there is no access to the article at all like "the time period at which there is no access to the article continues for equal to or longer than three years" being as an index value, the article that has the index value which satisfies a certain condition may be compressed. In this case, however, it is not always true that the accessibility is properly determined.

For example, regarding the article that has no access at all for three years among the multiple articles in the blog that is popular as a whole, and the article that has no access at all for three years among the multiple articles in the blog that is unpopular as a whole, the former article may have a higher possibility to be accessed next. That is, it is difficult to properly determine the actual accessibility by only the index of the accessibility of the article. In other words, the determination on the article to be compressed with the popular blog and the unpopular blog being under the same condition is not always suitable in view of a desire to reduce opportunities of compression and decompression as much as possible.

Accordingly, the blog server 1 utilizes, in the step S104, the to-be-compressed-blog determining threshold that reflects the popularity of the blog, making the popular blog not likely to be the blog to be compressed.

In subsequent step S109, the blog server 1 stores the determination result on whether or not to compress the article as the determination information. For example, the flag which indicates compression or not compression and which is stored in the managing DB 53 as the determination information for the article is updated or maintained.

When the determination on whether or not to compress one article completes through the above procedures, the blog server 1 checks, in the step S110, whether or not the determination has completed for all the articles subjected to the process at this time in the blog subjected to the process presently, and when not completed yet, the process returns to the step S105, and the next article is selected. Subsequently, the steps S106 to S109 are executed.

When the determination on whether or not to compress has completed for all the article subjected to the process at this time in a certain blog, it is checked, in step S111, whether or not to subsequently execute the process on the other blog. When the similar process is executed on the other blog, the process returns to the step S101, the other blog is specified as the blog subjected to the process, and then the similar process is executed.

When, for example, the process has been completed for all the blogs subjected to the process at this time, the compression determining process in FIG. 5 is terminated from the step S111.

The blog server 1 executes such a compression determining process as illustrated in this FIG. 5 as needed. For example, the process may be executed for all the blogs stored in the blog DB 51 periodically. This causes each blog to be determined whether or not each article should be compressed, and the determination information is stored in the managing DB 53.

Note that it is desirable for each blog to execute the compression determining process as illustrated in FIG. 5 not only once at a certain time but also repeatedly for a certain time period. This is because it is expected that the accessed situation for the article changes moment by moment, and the article that has no access for equal to or longer than a predetermined time period may occur.

Figure 6:
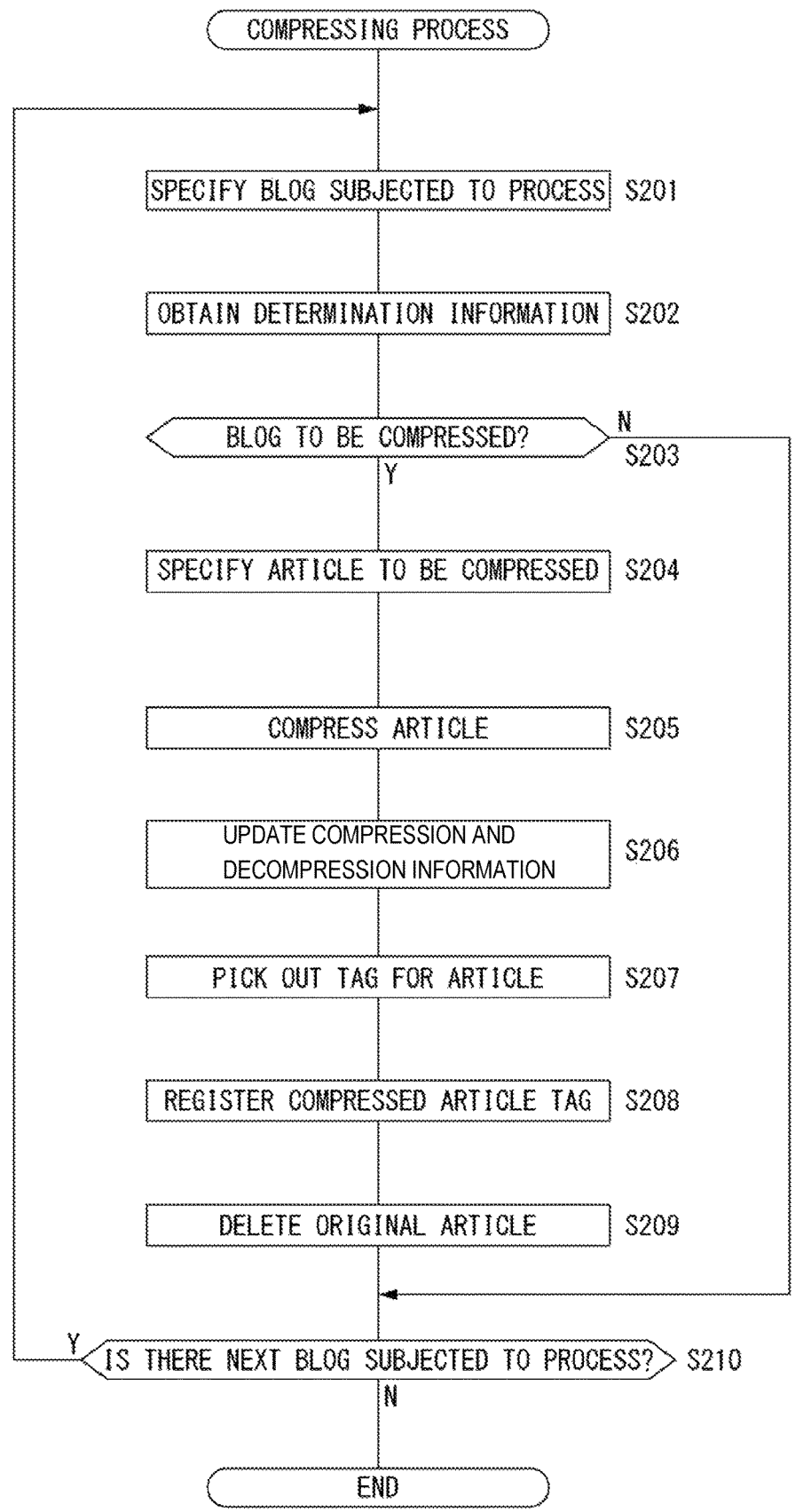
FIG. 6 is a flowchart of a compressing process according to the first embodiment.

The blog server 1 executes the above compression determining process as appropriate, and executes the compressing processes illustrated in FIG. 6 as appropriate. For example, the compressing process is periodically executed for all or some blogs.

As the compressing process illustrated in FIG. 6, first, the blog server 1 specifies, in step S201, one blog subjected to the process.

The blog server 1 obtains, in step S202, the determination information on the blog specified as being subjected to the process. That is, this is the determination information stored in the managing DB 53 in association with the blog ID of this blog. More specifically, this is a process of checking, for example, information indicating whether or not the blog is the blog to be compressed and determined in the compression determining process in FIG. 5, and the flag information that indicates whether or not to compress for each article.

The determination information enables to check whether or not the blog is the blog to be compressed, and whether or not each article in this blog should be compressed.

Accordingly, the blog server 1 determines, in step S203, whether or not the blog subjected to the process is the blog to be compressed.

When the blog subjected to the process is not the blog to be compressed, the blog server 1 progresses the process from the step S203 to step S210, and completes the compressing process on this blog. Next, it is also checked whether or not to execute the compressing process for the other blogs. When the compressing process is executed on the other blog, the process returns to the step S201, and the other one blog is specified as the blog subjected to the process.

When there is equal to or greater than one article to be compressed, the blog server 1 progresses the process from the step S203 to step S204, and specifies the article to be compressed among the articles belonging to the blog to be compressed. When the plurality of articles is the articles to be compressed, all the articles to be compressed are specified.

Subsequently, the blog server 1 compresses the article in the step S205. That is, the data on the one or the plurality of articles specified in the step S204 is compressed. Next, the article that becomes the compressed data is stored in the blog DB 51 and the image DB 52 in association with the blog.

What compression is to be executed in the step S205 may vary.

First, as the setting for the part to be compressed, i.e., as the kind for which part in the article data is to be compressed, the followings are considerable.

Both the text data and the image data in the article are compressed.

All the text data in the article is compressed.

A part of the text data in the article is compressed.

All the image data in the article is compressed.

A part of the image data in the article is compressed.

According to the compression on both the text data and the image data in the article, a compression effect is enhanced, and thus a reduction effect of a necessary storage capacity is enhanced.

According to the compression on all the text data in the article, depending on the text data amount and a compression percentage, the compression effect (the capacity reduction effect) is enhanced. In particular, this is effective for the blog that has the article contents which are mainly text data.

According to the compression on the part of the text data, a response and a distribution if an access is made after the compression are prompt. For example, the last half part (the part not appear in a first view at the time of viewing) of the blog is compressed. It is expected that the compressed part is decompressed and distributed as will be described later, but since the first view part is not compressed, the data can be promptly (without a decompressing process) distributed to the user terminal 5. Moreover, when the last half part is decompressed and distributed while the first view is being displayed on the user terminal 5, the user feels as if there is no delay in response.

Moreover, the compression on only the text data has advantages such that a process load is little in comparison with a case in which the image data is compressed, and the process time is short.

According to the compression on all the image data in the article, since the part that has a large data amount is compressed, the compression effect (the capacity reduction effect) is enhanced. Regarding the compression on the image data, when the compression that decreases the resolution of the image is executed, the capacity reduction effect is particularly high. When there are multiple pieces of the image data, the compression may be executed on not all the image data but some pieces of the image data.

When some pieces of the image data in the article are compressed, it is appropriate if the image that does not appear in the first view at the time of viewing should be selected and compressed. In that case, when an access is made after the compression, it is appropriate if the image data that does not need a decompression should be distributed first. Hence, the user feels as if there is no delay in response. Next, the subsequent image data may be decompressed and distributed while the first view is being displayed on the user terminal 5.

The above setting for the part to be compressed in the article may be fixed, or may be changed in accordance with a status. For example, an automatic selection may be permitted in accordance with the storage resource status of the blog DB 51 and that of the image DB 52, etc.

When, for example, the resource of the blog DB 51 which can record becomes equal to or lower than a predetermined quantity, the compression on the text data is selected, and when the resource of the image DB 52 which can record becomes equal to or lower than a predetermined quantity, the compression on the image data is selected. When the storable capacities of both the blog DB 51 and the image DB 52 decrease, both the text data and the image data are compressed, etc.

Moreover, the setting for the part to be compressed may be automatically selected for each blog and for each article.

An example of deciding the compressing process details in accordance with the contents of the article is as follows.

When the text data in the article is equal to or larger than a predetermined amount, only the text data is compressed, and when less than the predetermined amount, the text data and the image data are entirely compressed.

When the image data is contained in the article, only the image data is compressed.

Furthermore, as an example of selecting the part to be compressed for each blog, a determination is made on whether the blog is mainly a text blog or is mainly an image blog in accordance with a ratio between the text and the image in the entire blog. In the case of the mainly text blog, the text data may be compressed, and in the case of the mainly image blog, the image data may be compressed.

Conversely, when a priority is given to the distribution speed to be felt by the user when an access is made, in the case of the mainly text blog, the image data may be compressed, and in the case of the mainly image blog, the text data may be compressed.

Note that when a motion image is contained as the image data, compression on both the motion image and the sound data, or either one may be selected.

In addition to the above-described setting for a part to be compressed, a setting for a compression scheme is also broadly considerable. Various schemes are well known for compression on the image data and on the text data, and the compression percentage is selectable variously. Selection can be also made for lossless compression or for lossy compression.

Regarding to this compression scheme, a certain compression scheme may be fixedly applied, or may be selected in accordance with a status.

When, for example, the resource of the blog DB 51 or that of the image DB 52 which can record becomes equal to or lower than a predetermined amount, the compression scheme may be changed to a compression scheme that has a higher compression percentage.

Moreover, the compression scheme may be automatically selected for each blog and for each article.

For example, the lower the popularity of the blog is, the higher the compression percentage is set, or the compression scheme that has a different compression percentage is selected in accordance with the low accessibility to the article, and the like.

After executing, in the step S205 in FIG. 6, the compressing process on the one or the plurality of articles to be compressed in the blog subjected to the process presently, the blog server 1 updates (from compression permitted to compression unpermitted) the information (flag information) that indicates whether or not to compress the article subjected to the compression process.

Subsequently, the blog server 1 updates, in step S206, the compression and decompression information in the managing DB 53. In this case, for example, the flag information is updated so as to indicate that the compressed article in the blog is in the compressed status. Moreover, a compression past-record is also added.

The blog server 1 sets, in step S207, the tag for each compressed article. The tag in this case is information that indicates a keyword reflecting the contents of the article and genre information of the article, and is utilizable for searching and pick-out of the article.

Compression of the article results in a difficulty in text searching for the article. That is, when it is desirable to also put the compressed article in a search range, it is necessary to take a time for executing the decompression at the time of searching. Hence, the tag is set and registered in advance.

When the process in the step S207 is being executed, regarding the article subjected to the process, both the compressed article and the original article before the compression (i.e., the uncompressed article) are stored.

Accordingly, in the step S207, the blog server 1 picks out a frequently appearing word, picks out a noun by morphological analysis, obtains the genre information, etc., from the data on the uncompressed article, and sets one or the plurality of phrases to be registered as the tags.

Next, the blog server 1 registers, in step S208, such a tag as a compressed article tag in the managing DB 53. That is, one or the plurality of phrases like a keyword is registered in association with each of the compressed articles.

Note that the setting and registration of the compressed article tag are executed on a given article in the example illustrated in FIG. 6 when this article is compressed, but may be executed on all the articles in advance. In particular, the tag is applied for the article search, and if the tags are registered in advance for all the articles, such a tag is applicable as the compressed article tag in this embodiment. Hence, it is unnecessary to execute the steps S207 and S208.

In the case of, however, a system that does not particularly register the tags for all the articles, by registering the compressed article tags in the steps S207 and S208 as illustrated in FIG. 6, the process becomes a minimum-requisite process for the necessary article. Hence, this is advantageous for preventing a process load on the blog server 1 from increasing.

The blog server 1 deletes, in step S209, the data on the original article before the compression for the compressed article. Needless to say, when only a part of the article is compressed, the original data on the compressed part only is deleted. Moreover, when the process of compressing again the decompressed article is executed, the decompressed article that is the original data on the article before the compression is deleted.

When the compressing process has been completed for the one blog through the above processes, the blog server 1 checks, in step S210, whether or not there is other blog subjected to the process.

When the process for all the blogs subjected to the process at this time has been completed, the compressing process in FIG. 6 is terminated from the step S210.

By executing the above compressing process in FIG. 6, the actual compressing process is executed on the article determined as compression permitted by the compression determining process in FIG. 5, and the recovery of the storage resource is achieved.

Subsequently, the process of the blog server 1 when there is an access request to the blog or the article therein will be described with reference to FIGS. 7 and 8.

The blog server 1 that confirms, in step S301, the receive of the access request from the user terminal 5, determines, in subsequent step S302, whether or not the requested article is the compressed article.

When the article is not the compressed article, the blog server 1 progresses the process from the step S302 to step S303, and distributes the requested article in a normal scheme. That is, the webpage data on the corresponding article is read from the blog DB 51, and is transmitted to the user terminal 5. This enables the audience who is using the user terminal 5 to view the desired article.

When the article to which the access request is made is the compressed article, the blog server 1 progresses the process to step S304, and executes the decompressing process. That is, the data in the compressed status on the corresponding article is read from the blog DB 51, and the decompressing process is executed. Next, the webpage data that has been decompressed is transmitted to the user terminal 5 in step S305. Hence, even if the article has been compressed, the audience who is using the user terminal 5 can view the desired article.

Note that when a part of the data on the article, in particular, the data other than the region to be appeared as the first view in the webpage data is compressed as described above, the blog server 1 can first transmit the uncompressed part of the article to the user terminal, execute the decompressing process on the compressed part during such a transmission, and transmit the data that has the decompression completed. This enables a distribution that does not cause the audience to feel the decompressing process time, and thus the service performance of the blog server 1 can be maintained.

Moreover, when, in addition to the compression on the part other than the first view, a part of the article is compressed, it is likewise desirable to first transmit the uncompressed part in the article.

Figure 8A:
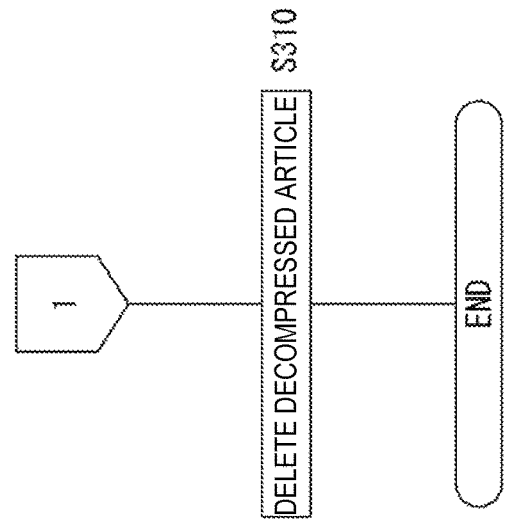
FIGS. 8A, 8B and 8C are flowcharts of an example process after decompression according to the embodiment.
Figure 8B:
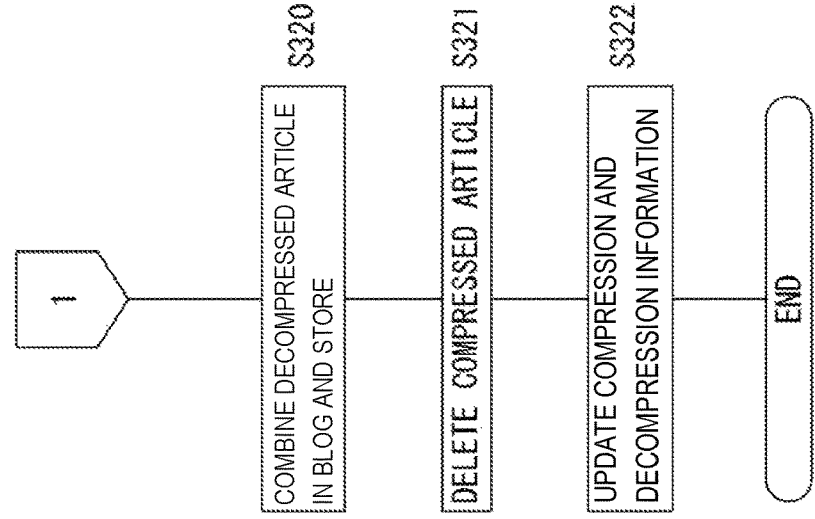
Figure 8C:
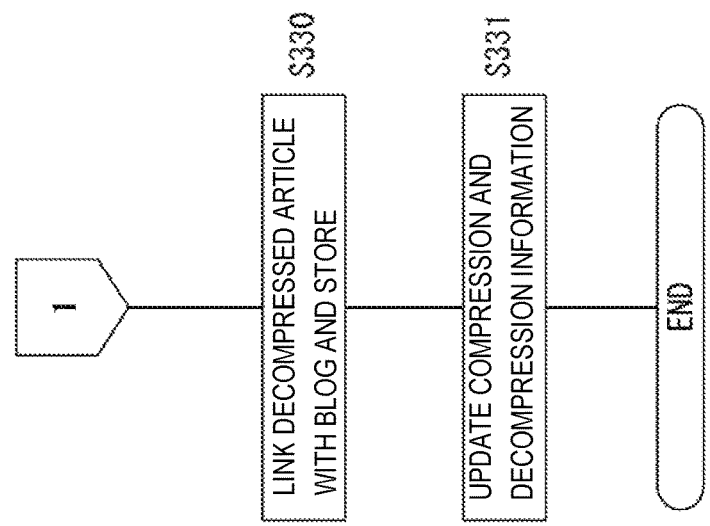

After the compressed article is decompressed and distributed, example processes as illustrated in FIG. 8A, FIG. 8B, and FIG. 8C are considerable.

Figure 7:
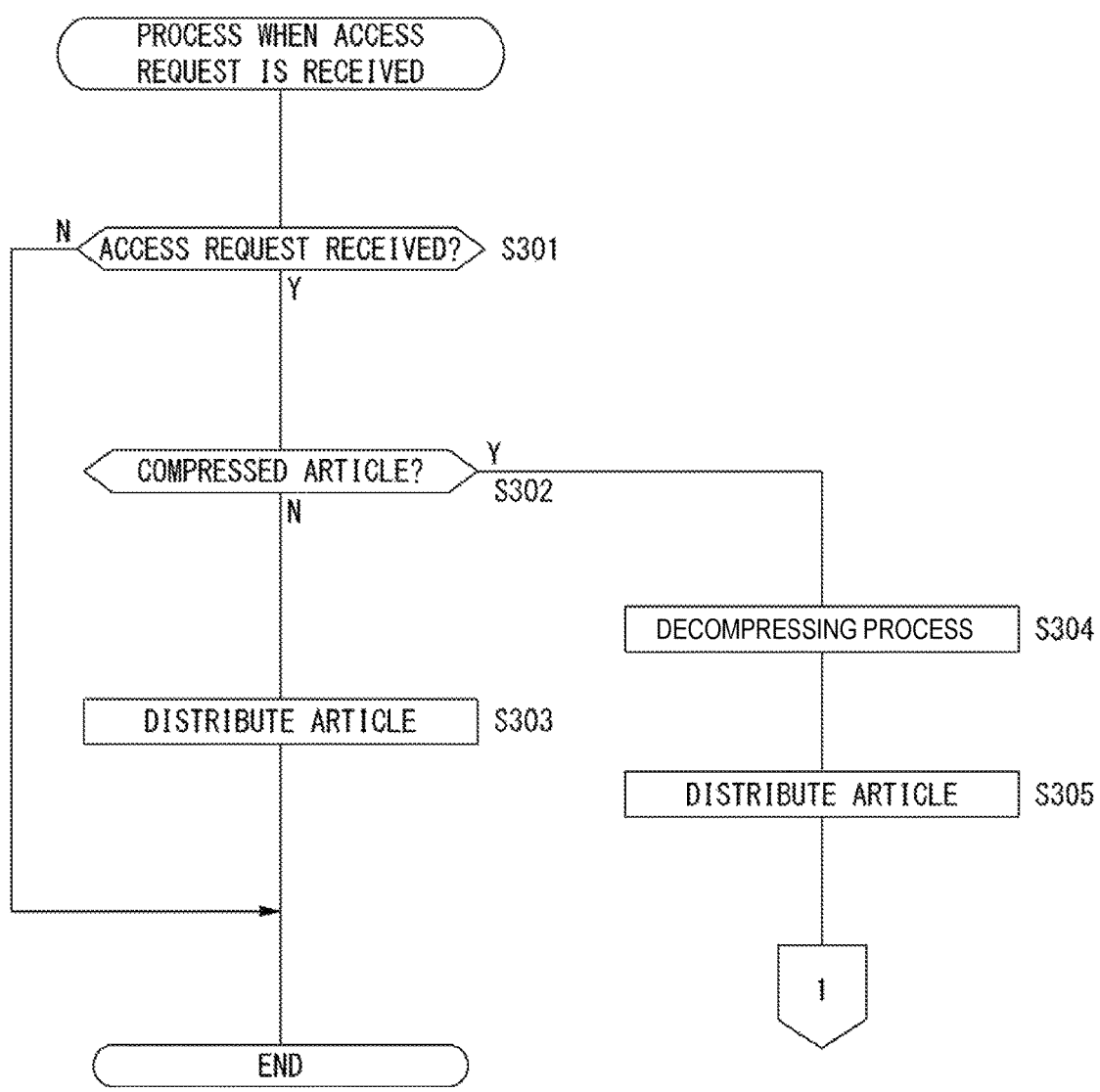
FIG. 7 is a flowchart of a process when an access request is received according to the embodiment.

First, in the example case in which the process progresses to step S310 in FIG. 8A from the step S305 in FIG. 7, the blog server 1 does not store the decompressed article, i.e., the decompressed data on the compressed article, i.e., the distributed webpage data, and deletes such data.

This is based on an assumption that the present access request to such an article is an exceptional access, and this article still has the low accessibility and thus being compressed. Hence, the compressed article is stored as it is.

When a subsequent access occurs, the decompressing process is executed access by access. Although a decompressing process load is produced in accordance with the access request, since it can be considered that the number of accesses is small at all, an advantageous effect in storage resource can be maintained by storing such an article in the compressed status.

In contrast, an occurrence of the access to the compressed article can also be considered such that the accessibility for the compressed article (the article determined as having a low accessibility) may be increasing.

Hence, the example in which the process progresses to the step S320 in FIG. 8B from the step S305 in FIG. 7 is expected. The blog server 1 combines, in the step S320, the decompressed article data in the blog. Next, the compressed article is deleted in step S321. That is, instead of the compressed article combined in the blog so far, the data on the decompressed article (the decompressed article) is combined in the blog.

The blog server 1 updates, in step S322, the compression and decompression information in the managing DB 53. That is, the information is updated in such a way that the corresponding article in the blog is the data on the article in the decompressed status from the compression (i.e., the decompressed article). Moreover, past-record information like the date and time of the decompression is added.

When the decompression is executed as described above, since the compressed article is replaced with the decompressed article, the data on the article can be distributed without a decompression when there is an access request subsequently.

Note that when the number of subsequent accesses to the decompressed article is small and the determination is made in the compression determining process in FIG. 5 that the accessibility is still low, such an article is compressed again by the compressing process in FIG. 6. Hence, when the article is still unpopular, the data on the article is compressed again, and thus there is no large disadvantage in comparison with the process in FIG. 8A in view of maintaining the storage resource.

Moreover, when the compressing process is executed by lossy compression, even if the data on the decompressed article decompressed by the subsequent decompressing process is stored, the occupied storage area in the blog DB 51 is smaller than a case in which the uncompressed article is stored, thus advantageous.

FIG. 8C illustrates the example in which the decompressed article is stored together with the compressed article.

When the process progresses to the step S330 in FIG. 8C from the step S305 in FIG. 7, the blog server 1 registers the decompressed data on the article in association with the blog. However, the compressed article is stored as it is. Next, the blog server 1 updates, in step S331, the compression and decompression information in the managing DB 53. That is, the information is updated so as to indicate that there is the decompressed article for the corresponding article in the blog. Moreover, the past-record information like the decompression date and time is added.

In this case, by storing the decompressed article, the data on the article can be distributed without the decompressing process when an access request is made subsequently.

However, by storing both the decompressed article and the compressed article, a load on the storage resource increases. Hence, for example, the decompressed article may be deleted after a certain time period has elapsed. This achieves a circumstance enabling a distribution without the decompressing process when an access is made again for a certain time period when there is the access request.

Moreover, when the compressed article and the decompressed article are both stored in this way, and when the article becomes the article to be compressed by the subsequent process in FIG. 5, in the compressing process in FIG. 6, a process of deleting the decompressed article may be executed.

4. Second Embodiment

According to a second embodiment, the popularity degree index to be obtained is a value calculated from plural pieces of information. That is, according to the first embodiment, one of the pieces of information stored in the managing DB 53 as the blog actual-achievement information is obtained as the popularity degree index, while according to the second embodiment, the popularity degree index is calculated and obtained from the plural pieces of information stored in the managing DB 53 as the blog actual-achievement information.

Similarly, regarding the accessibility index for each article, the accessibility is also calculated and obtained from plural pieces of information stored as the blog actual-achievement information.

In order to do so, the blog server 1 may calculate the popularity degree index and the accessibility index before executing the compression determining process illustrated in FIG. 5. Needless to say, the calculation may be executed in each case.

Figure 9:
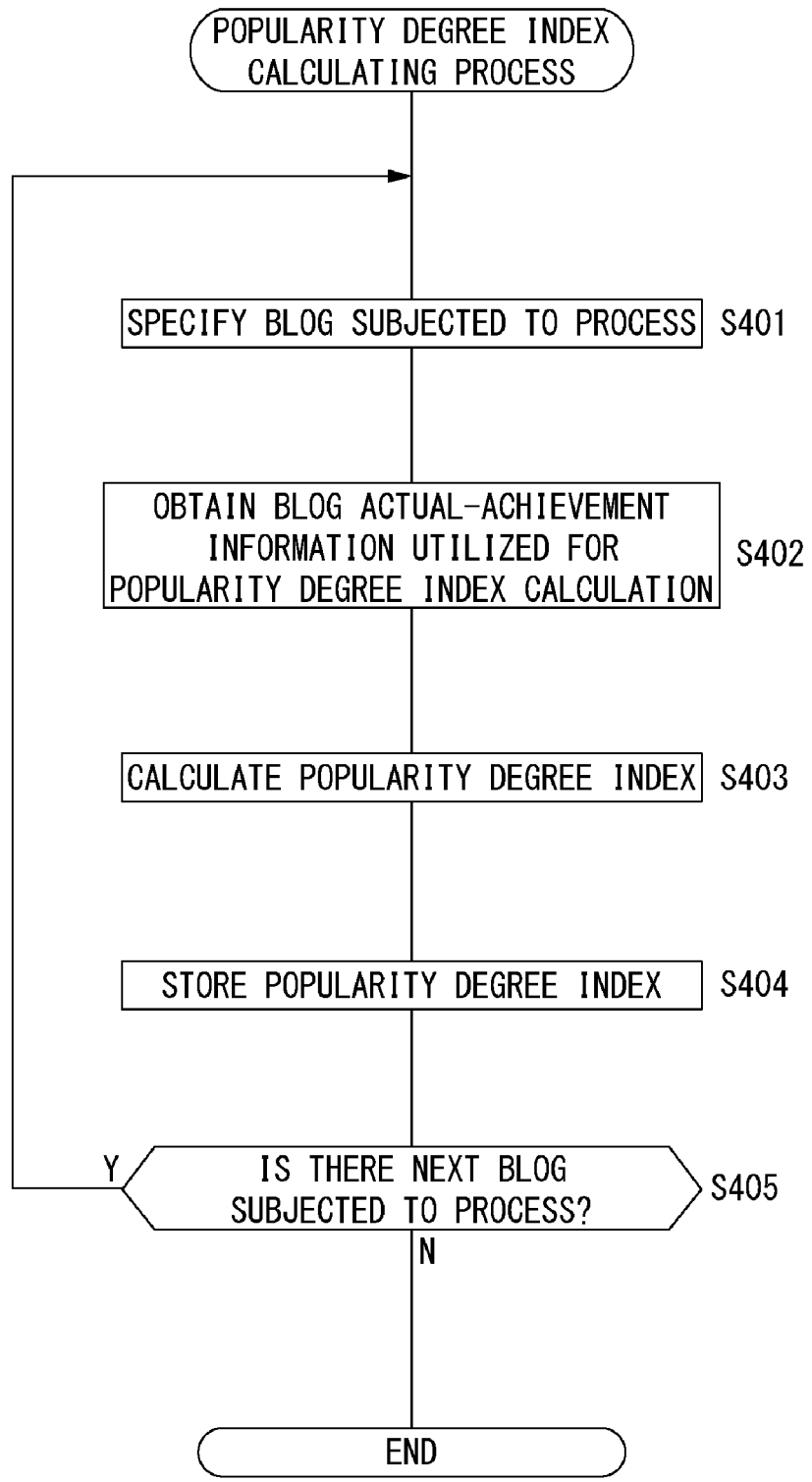
FIG. 9 is a flowchart of a popularity degree index calculating process according to a second embodiment.

FIG. 9 illustrates the process of calculating the popularity degree index.

As illustrated in the figure, the blog server 1 specifies, in step S401, the blog subjected to the process, i.e., the blog subjected to the calculation of the popularity degree index.

Subsequently, the blog server 1 obtains, in step S402, the blog actual-achievement information utilized for the calculation of the popularity degree index from the managing DB 53. More specifically, plural pieces of information are obtained among information, such as the total number of page views of the blog, the number of unique users who have accessed the blog, the total linked number, the value that indicates the page ranking of the blog, the length of a time period at which there is no access request to the blog, the total number of page views for the entire blog within a predetermined time period, the value that indicates the increasing tendency of the page view for the entire blog, the value that indicates the update frequency of the blog, the number of clicks to the advertisement provided on the blog page, and the value that indicates the increasing tendency of the data amount for the entire blog, all stored as the blog actual-achievement information for each blog.

The blog server 1 calculates, in step S403, the popularity degree index from the plural pieces of obtained information. When the total page views of the blog and the number of unique users who have accessed the blog are obtained from the managing DB 53 as the information for calculating the popularity degree index, a value that becomes a source for calculating the popularity degree index is obtained for each of the total number of page views of the blog and the number of unique users who have accessed the blog. For example, a value (a normalized value) obtained by normalizing the total number of page views of the blog into 1 (low popularity) to 100 (high popularity) may be calculated, and a value (a normalized value) obtained by normalizing the number of unique users who have accessed the blog into 1 to 100 may be calculated. That is, executed in the process in the step S403 are a process of adding the normalized value of the total number of page views of the blog and the normalized value of the number of unique users who have accessed the blog, and a process of calculating an average value. Accordingly, the popularity degree index of the blog subjected to the process is calculated.

By obtaining the popularity degree index from the plural pieces of information, a further comprehensive estimation of the popularity degree of the blog subjected to the process is enabled. In the case of, for example, the blog which has a large total number of page views, but which has a small number of accessed unique users, it is estimatable that this is a blog which is popular to particular users. Hence, obtainment of the popularity degree index by combining the plural pieces of information is often effective for calculating the proper popularity degree index for each blog.

Note that the above-described obtainment of the popularity degree index using the two pieces of information is merely an example, and the calculation may be executed using equal to or greater than three pieces of information, or the calculation may be executed using all the indexes.

The blog server 1 stores, in step S404, the calculated popularity degree index in the managing DB 53.

By storing the popularity degree index in the managing DB 53, the popularity degree index itself stored in the process in the step S102 may be obtained in the compression determining process illustrated in FIG. 5.

Next, the blog server 1 determines, in step S405, whether or not there is the next blog subjected to the process, and when there is the next blog subjected to the process, returns the process to the step S401, and specifies the next blog. Conversely, when there is no next blog subjected to the process, the popularity degree index calculating process illustrated in FIG. 9 is terminated from the step S405.

Note that the blog subjected to the process may be all the blogs stored in the blog DB 51, or may be some of the blogs. When some of the blogs are subjected to the process, the blog that has a large change in blog actual-achievement information stored in the managing DB 53 like the blog which has the number of accesses keenly increasing may be subjected to the process. This enables an efficient selection of the blog that needs a re-calculation of the popularity degree index as the blog subjected to the process.

Figure 10:
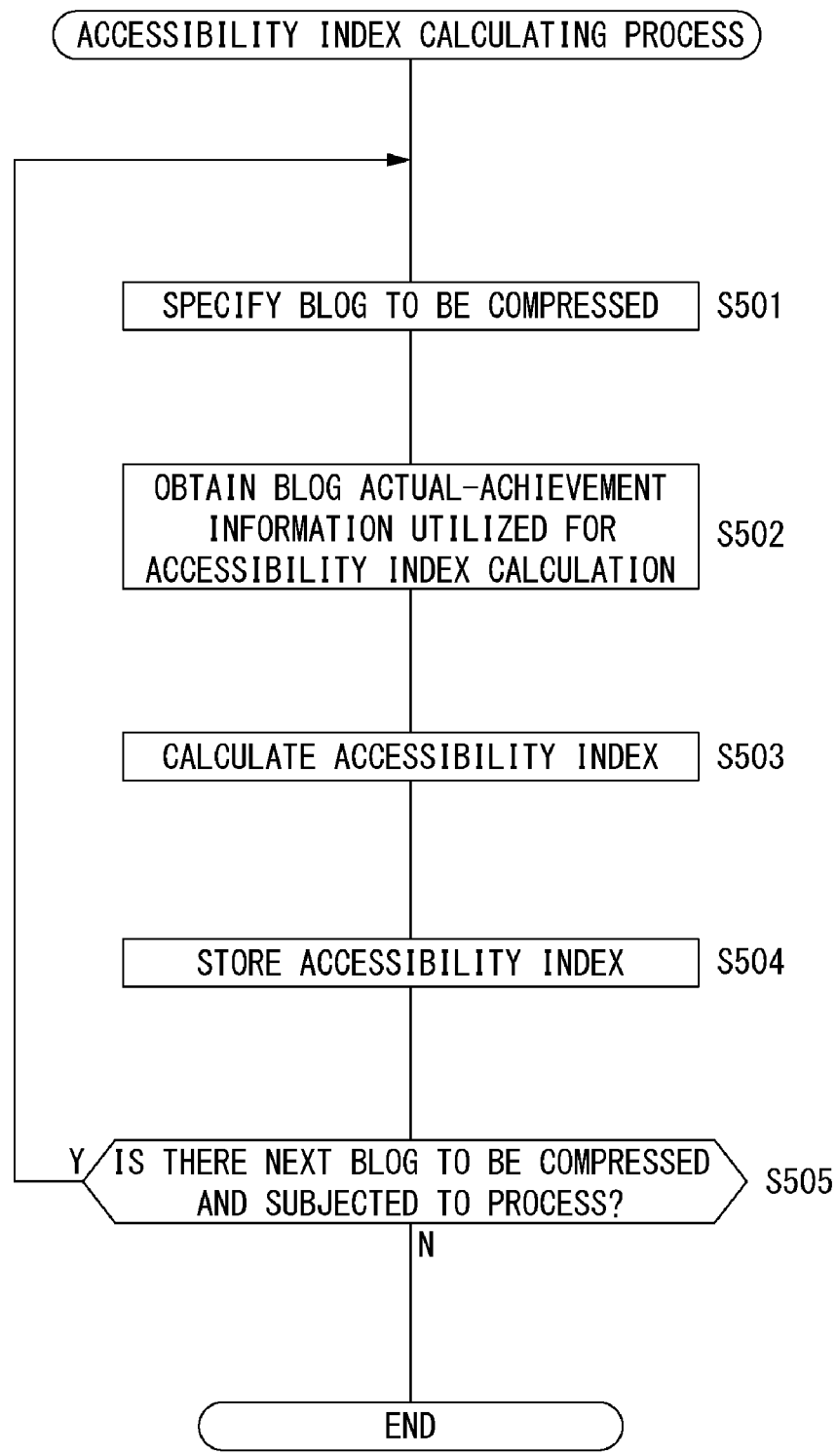
FIG. 10 is a flowchart of an accessibility index calculating process according to the second embodiment.

FIG. 10 illustrates a process of calculating the accessibility index.

The blog server 1 specifies, in step S501, one blog among the blogs to be compressed. In the following processes, the accessibility index is calculated for the specified blog.

The blog server 1 obtains, in step S502, the information utilized for calculating the accessibility index for each of the plurality of articles contained in the blog subjected to the process from the blog actual-achievement information in the blog DB 51. That is, when the blog that has ten articles is subjected to the process, the information is obtained for each of the ten articles.

More specifically, the plural pieces of information are obtained among information, such as the total number of page views for each article, the number of unique users who have accessed the article, the total linked number for each article, the value that indicates the ranking of the article, the length of a time period at which there is no access request to the article, the number of page views for the article within a predetermined time period, the value that indicates the increasing tendency of the page view for the article, and the number of clicks to the advertisement provided on the article page, all stored as the blog actual-achievement information for each article.

The blog server 1 calculates, in step S503, the accessibility index for each article from the plural pieces of obtained information. At this time, the accessibility index of the article may be obtained by adding the normalized value for each kind of information, or may be calculated by weighting in accordance with the importance for each kind of information.

Subsequently, the blog server 1 stores, in step S504, the calculated accessibility index for each article in the managing DB 53. By storing the accessibility index in the managing DB 53, the stored accessibility index itself may be obtained in the process in the step S107 in the compression determining process as illustrated in FIG. 5.

Next, the blog server 1 determines, in step S505, whether or not there is the blog to be compressed which becomes the next blog subjected to the process, and when there is the next blog to be processed, returns the process to the step S501, and specifies the next blog to be compressed. Conversely, when there is no blog to be compressed that becomes the next blog subjected to the process, the accessibility index calculating process illustrated in FIG. 10 is terminated from the step S505.

Note that the blog to be compressed and subjected to the process may be all the blogs to be compressed, or may be some of the blogs. As for an example in which some of the blogs are to be subjected to the process, for example, the blog which remarkably exceeds the to-be-compressed-blog determining threshold and which needs all the articles to be compressed does not need the calculation of the accessibility index for each article. Hence, such a blog may be excluded from the blog subjected to the process. In other words, the blog to be compressed which slightly exceeds the to-be-compressed-blog determining threshold needs a determination on which article should be compressed, and such a blog is subjected to the calculation of the accessibility index.

Note that the accessibility index calculating process in FIG. 10 takes only the blog subjected to the compressing process as the blog subjected to the process. This can be achieved by, for example, after calculating the popularity degree index by executing the process in FIG. 9 on all the blogs stored in the blog DB 51, executing the process in the step S104 in FIG. 5 to determine, for each blog, whether or not the blog is to be compressed. Next, the accessibility index calculating process (in particular, the processes in the steps S502 to S504) as illustrated in FIG. 10 is executed on the blog determined as the blog to be compressed.

Moreover, the above result can be achieved by executing the steps S402 and S403 in FIG. 9 instead of the step S102 illustrated in FIG. 5, and by executing the steps S502 and S503 in FIG. 10 instead of Step S107 illustrated in FIG. 5. At this time, the processes in the steps S502 and S503 may be executed on only the article determined as subjected to the process in the step S105.

Note that when the popularity degree index calculating process in FIG. 9 and the accessibility index calculating process in FIG. 10 are periodically executed by batch process, the object subjected to the popularity degree index calculating process and the accessibility index calculating process may be all the blogs and all the articles stored in blog DB 51.

For example, the processes illustrated in FIGS. 9 and 10 may be executed on all the blogs and all the articles, and then the compression determining process and the compressing process illustrated in FIGS. 5 and 6 may be executed. This enables an appropriate execution of the compressing process. In this case, the process in the step S501 is not the process of specifying the blog to be compressed but the process of selecting the blog subjected to the process.

When the popularity degree index and the accessibility index are calculated from the plural pieces of information, the respective indexes are calculated in advance by batch process, etc. This enhances the degree of freedom for the scheduling of the process.

This is suitable for a case in which, for example, calculation of the popularity degree index at a short time interval is desired in order to cope with the keen increase in popularity of a certain blog.

5. Third Embodiment

According to a third embodiment, an example will be described in which the compression is executed from the article that has a low accessibility index until the total data amount of the blog subjected to the process becomes equal to or smaller than a predetermined value.

Figure 11:
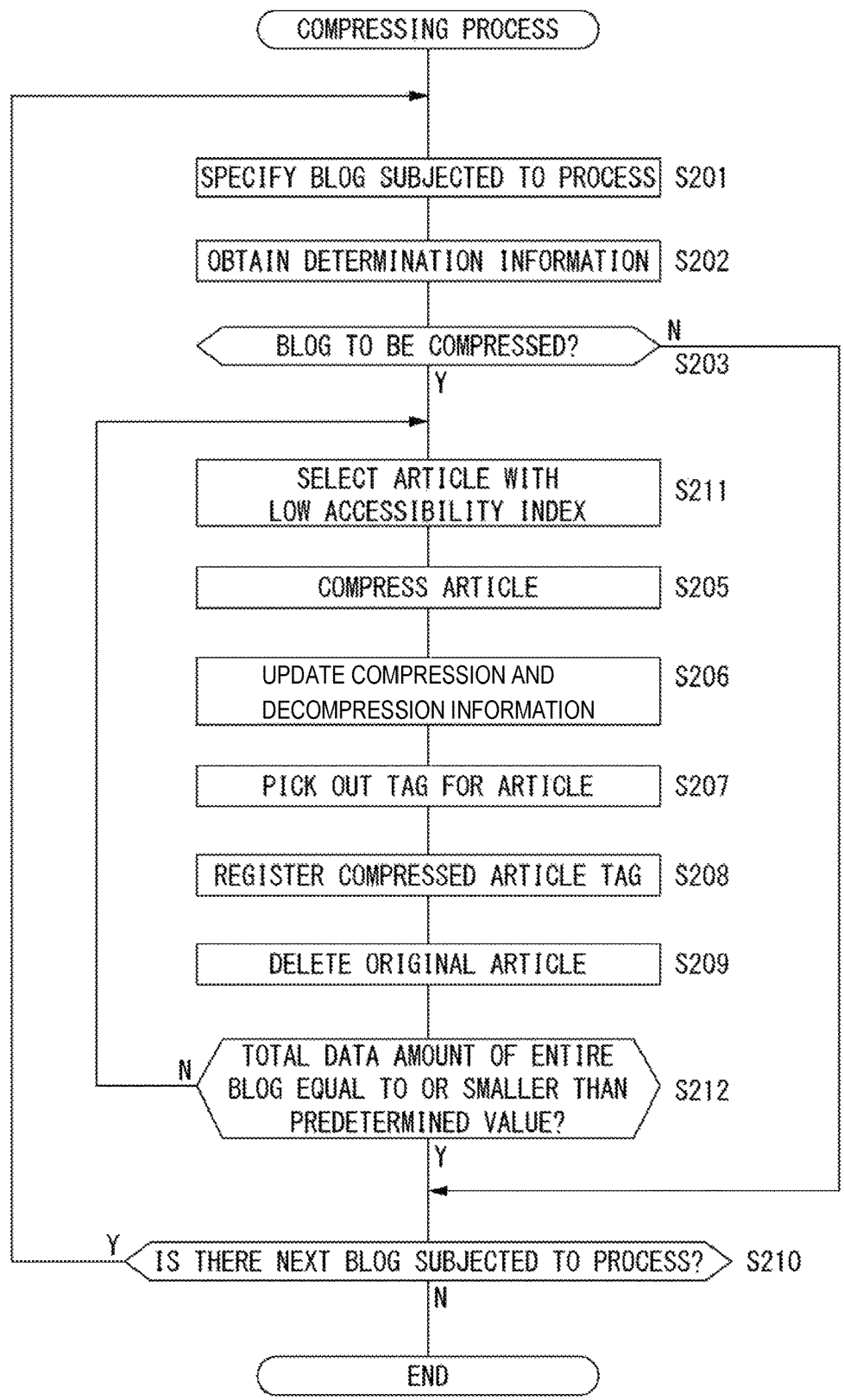
FIG. 11 is a flowchart of a compressing process according to a third embodiment.

FIG. 11 illustrates a flow of the compressing process. Since the outline of the flow of the process is the same as that of the compressing process illustrated in FIG. 6, the detailed description will be omitted as appropriate.

The blog server 1 selects one of the blogs to be compressed by executing the processes in the steps S201 to S203. Next, the respective following processes are executed on the selected blog.

First, the blog server 1 selects, in step S211, the article with a low accessibility index among the articles that belong to the selected blog. Next, the compression on the article, etc., is executed by executing the processes in the steps S205 to S209 on the article. The process in the step S211 is a process instead of the process in the step S204 in FIG. 6.

The blog server 1 that has completed the compression on the one article determines, in subsequent step S212, whether or not the total data amount of the entire blog is equal to or smaller than the predetermined value.

When the total data amount is larger than predetermined value, the determination is made such that the compression on each article in this blog is still insufficient, and the process returns to the process in the step S211, and the next article is selected.

Note that when there is no article to be selected next because all the articles have been compressed, the process transitions to the step S210 without a transition to the step S211, and a determination may be made on whether or not to start the process for the next blog.

When the total data amount of the selected blog becomes equal to or smaller than the predetermined value, the blog server 1 terminates the compressing process on this blog, and executes, in the step S210, the process of selecting the next blog subjected to the process.

The predetermined value applied in the process in the step S212 may be, for example, the to-be-compressed-blog determining threshold. It becomes unnecessary to newly calculate and store a value applied for the determination by applying the to-be-compressed-blog determining threshold. This contributes to reduction of a process load and to securement of the storage resource.

Moreover, in addition to the above case, a value obtained by multiplying the to-be-compressed-blog determining threshold by a coefficient like 0.8 may be applied as the predetermined value. When the blog to be compressed is owned by the user who frequently posts the articles, it becomes possible to suppress that the total data amount exceeds again the to-be-compressed-blog determining threshold by a single posting. Accordingly, since a time until the blog becomes again the blog to be compressed is extended, the execution frequency of the compressing process illustrated in FIG. 11 (or the processes in the steps S105 to S110 in FIG. 5) can be reduced. This achieves a reduction of the process load on the blog server 1.

According to the third embodiment, the compressing process on each article is immediately terminated in response to the total data amount of the blog subjected to the process which becomes equal to or smaller than the predetermined value. Hence, the compressing process that is likely to be excessive can be suppressed, and thus achieving a reduction of the process load on the blog server 1.

Note that the predetermined value may be provided or not provided in accordance with a situation. When, for example, the accessibility indexes of all the articles of the blog subjected to the process are low, the compressing process on all the articles (i.e., the processes in the steps S205 to S209 in FIG. 11) may be executed without setting the predetermined value. Such a blog has a low possibility for an execution of the decompressing process on the article in response to the audience's access. Hence, the storage resource can be secured without a concern for an increase in process load by the execution of decompressing process.

6. Fourth Embodiment

According to a fourth embodiment, an example will be described in which a determination is made on whether or not the compression on the article belonging to the blog is permitted based on how much the total data amount of the blog exceeds the to-be-compressed-blog determining threshold.

Figure 12:
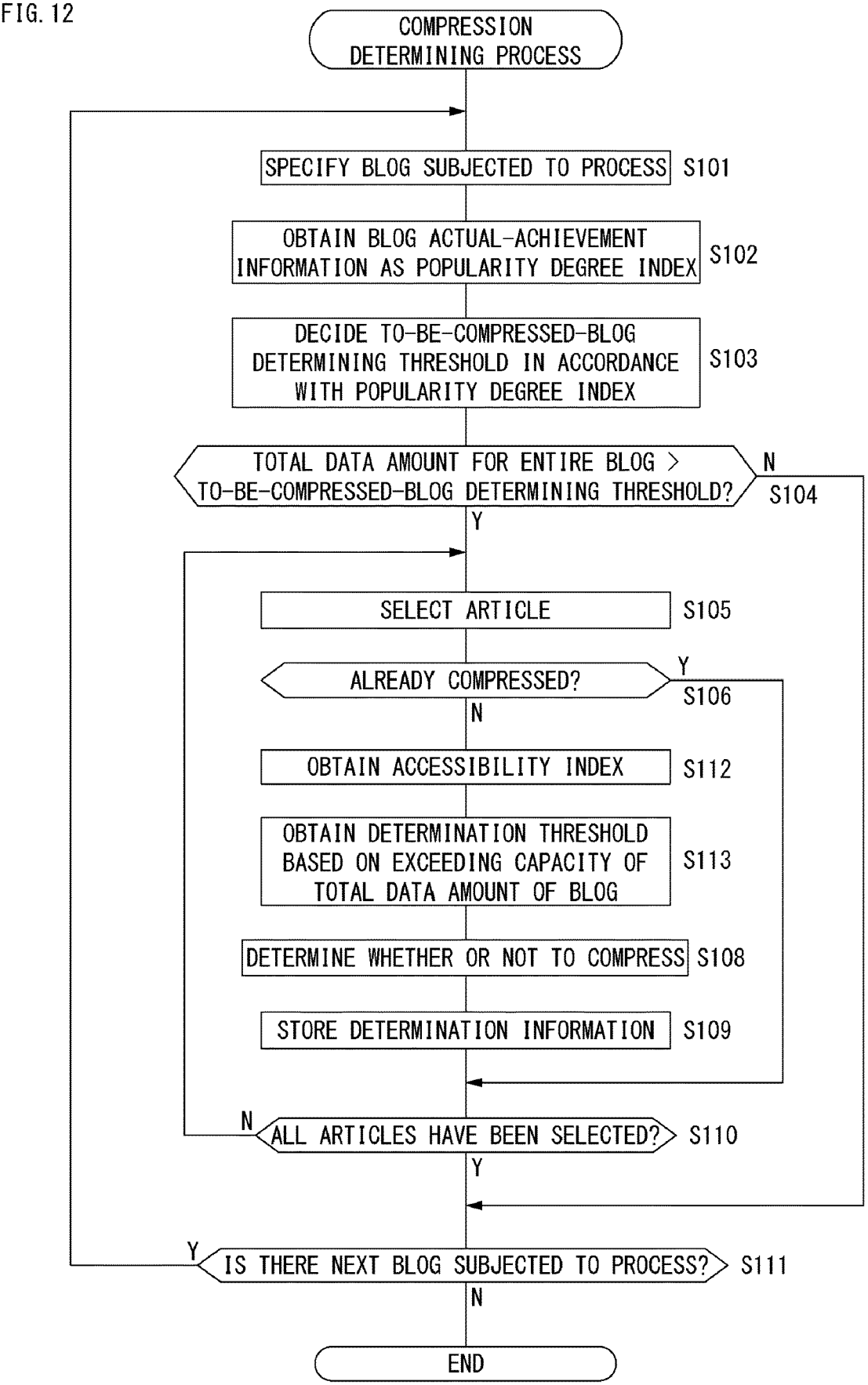
FIG. 12 is a flowchart of a compression determining process according to a fourth embodiment.

FIG. 12 illustrates a compression determining process. Since the outline of the flow of the process is the same as that of the compression determining process illustrated in FIG. 5, the detailed description will be omitted as appropriate.

The blog server 1 determines, in the steps S101 to S104, whether or not the blog is the blog to be compressed. Regarding the blog determined as the blog to be compressed at this time, how much the total data amount exceeds the to-be-compressed-blog determining threshold (i.e., the exceeding capacity) is grasped.

Subsequently, the blog server 1 determines whether or not the article selected in the step S105 should be compressed by executing the subsequent steps S106 to S109. At this time, whether or not to compress is determined in accordance with the largeness of the accessibility index, according to this embodiment, whether or not to compress is also determined with the above-described exceeding capacity being taken into consideration.

More specifically, in the foregoing first embodiment, for example, the example has been described with respect to the step S108 in FIG. 5 in which, when the length of a time period at which there is no access request for the article is selected as the accessibility index, it is determined whether or not the length of the time period is equal to or longer than three years, and the article that has no access request for equal to or longer than three years is determined as having a low accessibility, and thus determined as the article to be compressed.

According to this embodiment, the threshold that is "three years" is changed in accordance with the exceeding capacity. As an example, for the blog that has a large exceeding capacity, i.e., the blog that has a large number of articles which should be compressed, the threshold that is "two years" is set. This causes the article that has no access request for 2.5 years to be also subjected to the compressing process, and thus the securement of the storage resource is prompted. Moreover, for the blog that has a small exceeding capacity, i.e., the blog that has merely a small number of articles which should be compressed, the threshold that is "five years" is set. Hence, the article that has no access request for three years is excluded from the article subjected to the compressing process. This decreases the possibility of an occurrence of the decompressing process on the compressed article, while at the same time, efficiently secures the storage resource.

Therefore, the blog server 1 obtains, in step S112, the accessibility index, and obtains, in step S113, a determination threshold based on the exceeding capacity of the total data amount of the blog. In the step S113, instead of the obtainment of the determination threshold, a process of calculating the determination threshold, i.e., the process of calculating the threshold, such as two years, three years, or five years, as described above may be executed.

According to the fourth embodiment, by setting the appropriate determination threshold in accordance with the total data amount of each blog, an appropriate storage resource is secured.

7. Fifth Embodiment

According to a fifth embodiment, the blog server 1 executes, for each article, not only the determination on whether or not to compress based on the popularity degree index and on the accessibility index, but also a determination on whether or not to decompress the already-compressed article.

Figure 13:
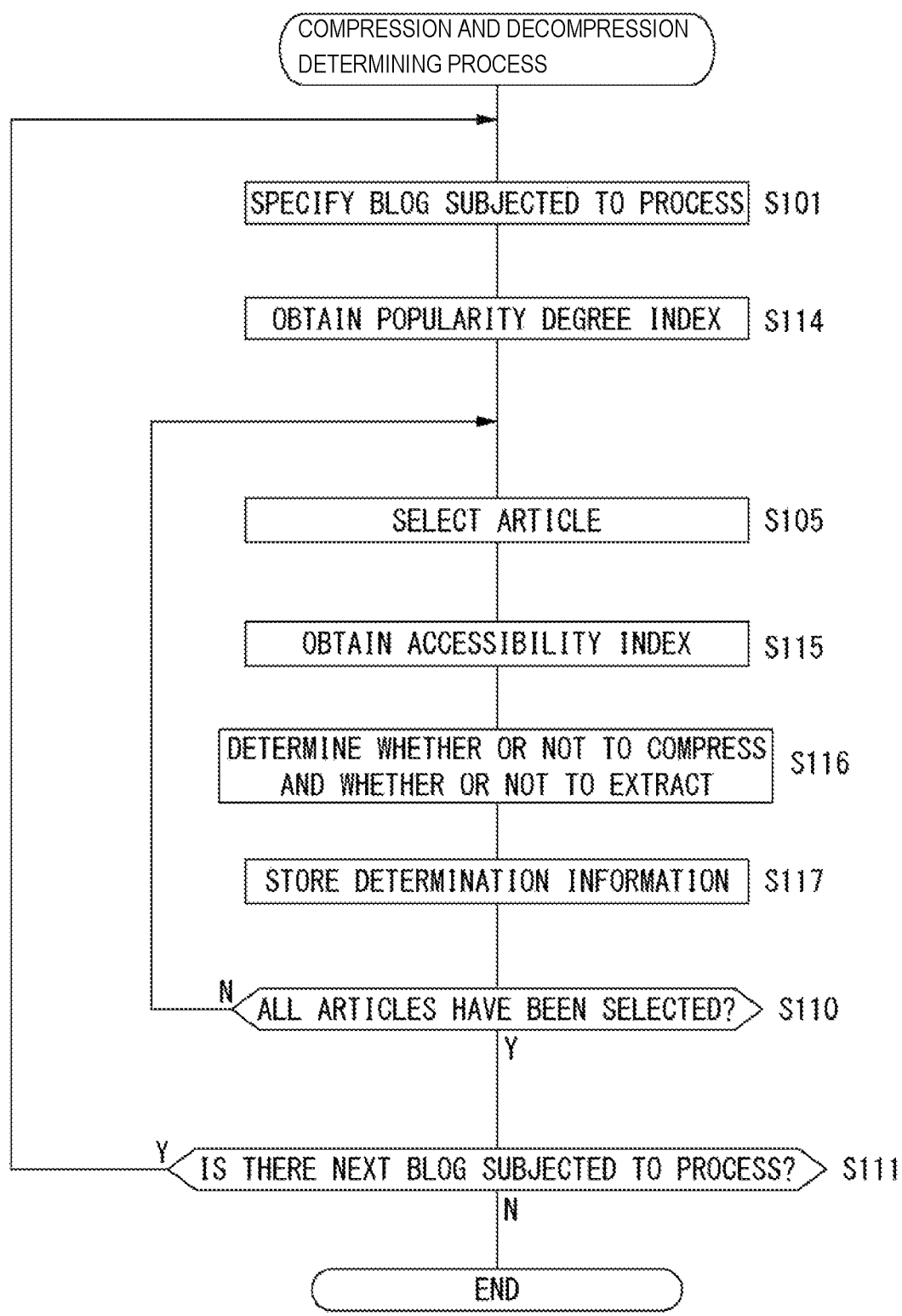
FIG. 13 is a flowchart of a compression and decompression determining process according to the fourth embodiment.

The blog server 1 executes, for example, a compression and decompression determining process in FIG. 13 periodically or at a predetermined timing. The process in FIG. 13 can be considered as the process instead of the compression determining process in FIG. 5 in the first embodiment. The same step number will be given to the same process as that of the process in FIG. 5, and the duplicated description will be omitted.

The blog server 1 specifies the blog subjected to the process (S101), obtains the popularity degree index (S114), and then executes a determination on each article in the steps S105, S115, S116, S117, and S110.

In the step S114, the blog actual-achievement information as the popularity degree index may be obtained like the step S102 in FIG. 5, or the popularity degree index calculated in FIG. 9 may be obtained.

The blog server 1 that has selected one article in the step S105 progresses the process to the step S115 to obtain the accessibility index regardless of whether or not the article has been already compressed. Regarding this process, the blog actual-achievement information as the accessibility index may be obtained like the step S107 of FIG. 5, or the accessibility index calculated in FIG. 10 may be obtained.

Next, the blog server 1 executes, in the step S116, the determination on whether or not to compress and on whether or not to decompress.

That is, the blog server 1 determines whether or not to compress like the step S108 in FIG. 5 for the uncompressed article or the decompressed article.

In contrast, for the compressed article, the blog server 1 executes the determination on whether or not to decompress by utilizing the popularity degree index and by the accessibility index.

For example, the popularity degree index is classified into three classes, such as high/middle/low, like the determination on whether or not to compress by utilizing information such as the total number of page views, etc.

Next, as the accessibility index, for example, the number of page views N for the article is utilized: and the blog that has a low popularity degree index; decompressed when the number of page views N for the article is equal to or greater than N1.

the blog that has a middle popularity degree index; decompressed when the number of page views N for the article is equal to or greater than N2.

the blog that has a high popularity degree index; decompressed when the number of page views N for the article is equal to or greater than N3.

However, N1>N2>N3.

That is, in the case of the compressed article of a popular blog, the decompression is permitted when the page view actual achievement has slightly increased. However, in the case of the compressed article of an unpopular blog, the determination is made with the threshold for permitting the decompression in accordance with the number of page views being increased. Hence, the article of the popular blog is likely to be permitted for decompression even once compressed. This is because that the accessibility is likely to increase in the case of the popular blog.

As another example, for example, as the accessibility index, a value K that indicates the increasing tendency of the page view for the article is utilized: and the blog with a low popularity degree index; decompressed when the increasing tendency value K is equal to or greater than K1.

the blog with a middle popularity degree index; decompressed when the increasing tendency value K is equal to or greater than K2.

the blog with a high popularity degree index; decompressed when the increasing tendency value K is equal to or greater than K3.

However, K1>K2>K3.

That is, in the case of the compressed article of a popular blog, when a slight increasing tendency of the page view is observed, the decompression is permitted. However, in the case of the compressed article of an unpopular blog, a determination is made such that the decompression is permitted when a remarkable increasing tendency of the page view is observed. In this case, also, the article of the popular blog is likely to be permitted for decompression even once compressed.

Next, the blog server 1 stores, in the step S117, the determination on whether or not to compress or the determination on whether or not to decompress for the article as determination information. For example, the flag on whether or not to compress or the flag on whether or not to decompress for the article is updated or maintained as the determination information in the managing DB 53.

The steps S110 and S111 are the same as those in FIG. 5.

Figure 14:
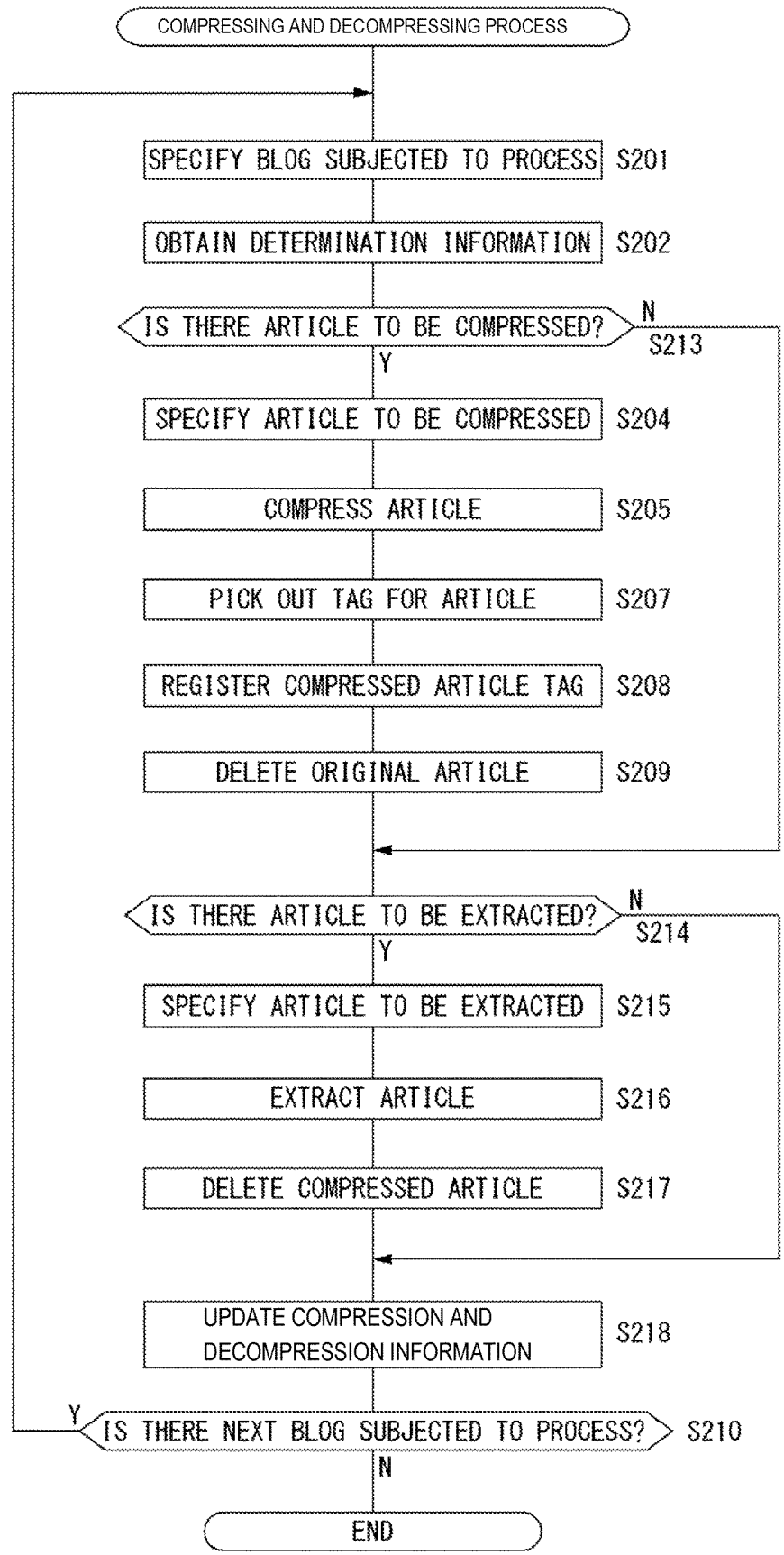
FIG. 14 is a flowchart of a compressing and decompressing process according to a fifth embodiment.

The blog server 1 also executes a compressing and decompressing process in FIG. 14 as needed. This is a process instead of the compressing process in FIG. 6 in the first embodiment. The same process as that in FIG. 6 will be denoted by the same step number, and the detailed explanation will be omitted.

The blog server 1 specifies, in the step S201, the blog subjected to the process, and obtains, in the step S202, the determination information.

The blog server 1 refers to the determination information on whether or not to compress and determines whether or not there is the article to be compressed in step S213. Next, the article to be compressed is specified in the step S204. Although a determination on whether or not there is any compressed article may be made in the step S213, a determination on whether or not the blog subjected to the process is the blog to be compressed may be made.

When one or the plurality of articles are specified as the articles to be compressed, the blog server 1 executes, in the step S205, the compressing process on each data on the one or the plurality of articles, sets and registers the tag, and deletes the original data on the article in the steps S207, S208, and S209 like the case in FIG. 5.

After executing the above steps S205 to S209, or after determining in the step S213 that there is no article to be compressed, the blog server 1 determines, in step S214, whether or not there is an article to be decompressed. That is, a determination is made on whether or not there is the article that should be decompressed among the compressed articles with reference to the determination information obtained in the step S202. When there is no article to be decompressed, the process progresses to step S218.

When there is one or the plurality of articles to be decompressed, the blog server 1 specifies, in step S215, the article to be decompressed, and executes, in subsequent step S216, a decompressing process on the specified article. In this case, the decompressed article data is combined with the blog instead of the compressed article so far. Moreover, the blog server 1 deletes, in step S217, the compressed article.

This causes the compressed article in the blog to be returned to the decompressed article in accordance with the increase in accessibility.

The blog server 1 updates, in step S218, the compression and decompression information in the managing DB 53. In this case, the flag information is updated so as to indicate that the compressed article in the blog is in a compressed status. Moreover, the compression past-record is added. Furthermore, the flag information is updated so as to indicate that the decompressed article in the blog is in a decompressed status. Still further, the decompression past-record is added.

When completing the compressing process and the decompressing process for one blog through the above processes, the blog server 1 checks, in step S210, whether or not to execute the process on other blogs.

Next, when the process has been completed for all the blogs subjected to the process at this time, the compressing and decompressing process in FIG. 14 is terminated from the step S210.

By executing the above compressing and decompressing process in FIG. 14, the actual compressing process on the article determined as compression permitted through the compression and decompression determining process in FIG. 13 and the actual decompressing process on the article determined as decompression permitted are executed. This achieves a recovery of the storage resource, and an execution of the decompression on the article that has the increasing accessibility, thereby improving the performance when the access is made.

When, for example, the article itself is updated such that regarding a given article of a blog, the describer of the blog changes the contents, or the audience posts a comment to the article, the accessibility to this article increases. According to this embodiment, an operation of canceling the compression is achieved for such an article.

Accordingly, such an operation is perceived in advance, and the compressed status is canceled in advance for the article of the blog which has been already compressed but which has an increasing accessibility.

This enables a prompt distribution of the article without the decompressing process at a time point at which an actual access is made.

8. Sixth Embodiment

According to a sixth embodiment, an example in which the blog server 1 determines whether or not to decompress the already-compressed article based on the contents of the article will be described.

For example, regarding an article that mentions a certain theme, although such an article is not getting attention a lot at a time point at which the article is uploaded, the possibility such that the article is searched increases (i.e., the accessibility increases) few years later because any incident or event relating to the theme mentioned in the article occurs in the world, and the linked number to the article increases.

Hence, such a tide is perceived in advance, and for the article which has been already compressed but which has the increasing accessibility, the compressed status is canceled in advance.

This enables a prompt distribution of the article without the decompressing process at a time point at which the actual access request is made.

Figure 15:
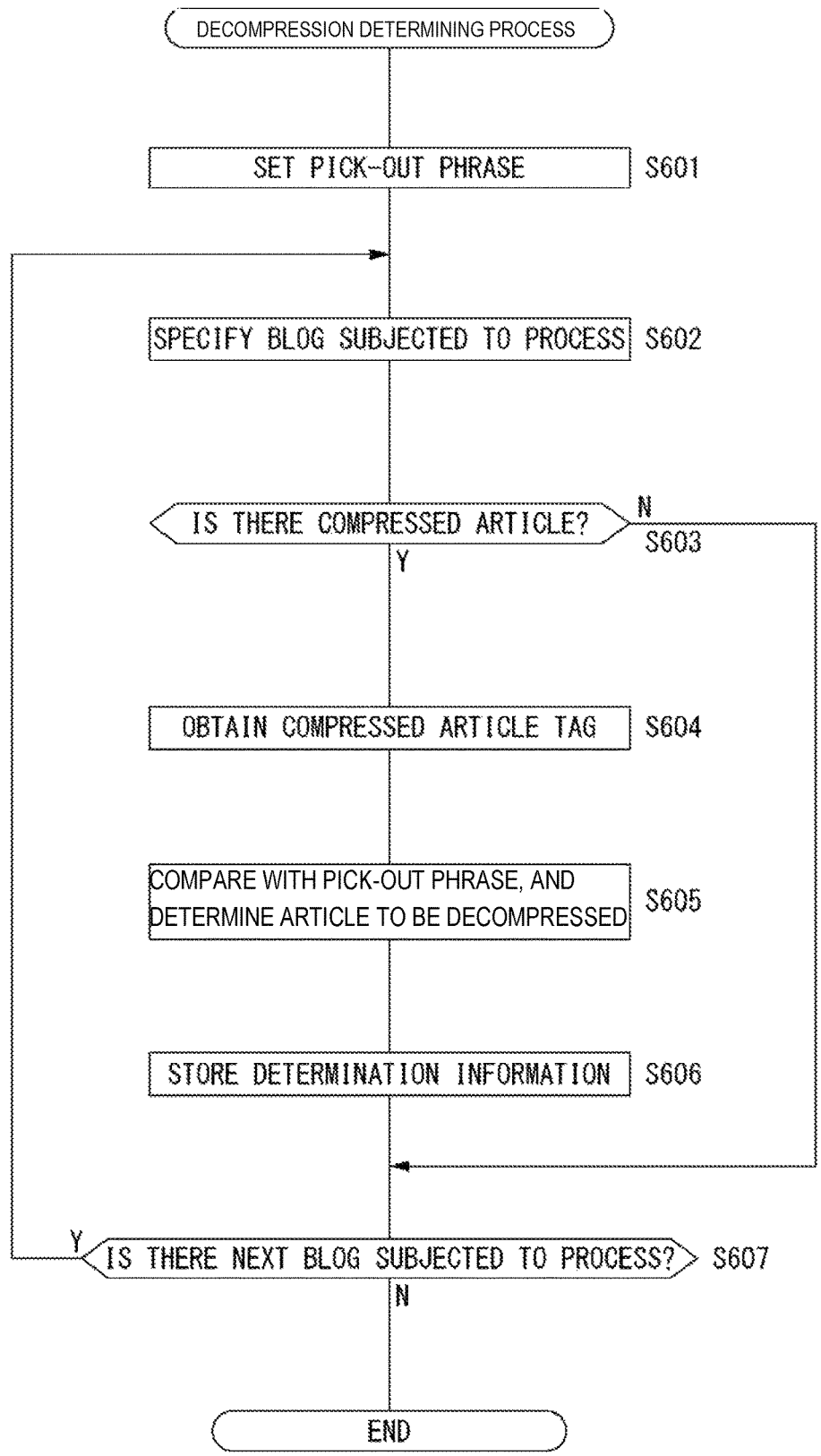
FIG. 15 is a flowchart of a decompression determining process according to a sixth embodiment.

FIG. 15 illustrates a decompression determining process. In addition to each process according to the first embodiment, the blog server 1 executes this decompression determining process periodically, etc., as needed.

The blog server 1 sets, in step S601, one or a plurality of pick-out phrases. For example, current-news words are set as the pick-out phrases. Examples are words frequently appearing in newspapers and news, words often used relating to entertainment, and fad words. Alternatively, a genre or relevant words that are in the news may be set as pick-out phrases. In the case of, for example, a time period at which the Olympics are being held, a genre "sport", the names of various games, the name of a player are set as the pick-out phrase.

The blog server 1 specifies, in step S602, one blog subjected to the process. Next, the blog server checks, in step S603, whether or not there is the compressed article in the specified blog. For example, the compression and decompression information in the managing DB 53 may be checked.

When there is no compressed article, since the determination on the decompression is unnecessary, the process progresses to step S607.

When the blog contains the compressed article, the blog server 1 progresses the process to step S604, and obtains the information on the compressed article tag for the blog from the managing DB 53. The compressed article tag contains tag information set for one or the plurality of compressed articles in a compressed status at least presently. That is, this is the tag information registered in the step S208 in FIG. 6, etc.

The blog server 1 compares, in step S605, the pick-out phrase set in the step S601 with the compression tag information obtained from the managing DB 53, and determines the article to be decompressed.

That is, the article that has the same or similar registered compressed article tag to the pick-out phrase is picked out, and is determined as the article to be decompressed.

The blog server 1 stores, in step S606, the determination information in the managing DB 53. That is, the information on the article determined as to be decompressed is stored.

When the decompression determining process for one blog completes through the above processes, the blog server 1 checks, in step S607, whether or not there is the next blog subjected to the process. When there is the next blog, the process returns to step S602, the next blog to be processed is specified, and the processes subsequent to the step S603 are executed as described above.

When the process for all the blogs subjected to the process at this time has been completed, the decompression determining process in FIG. 15 is terminated from the step S607.

Figure 16:
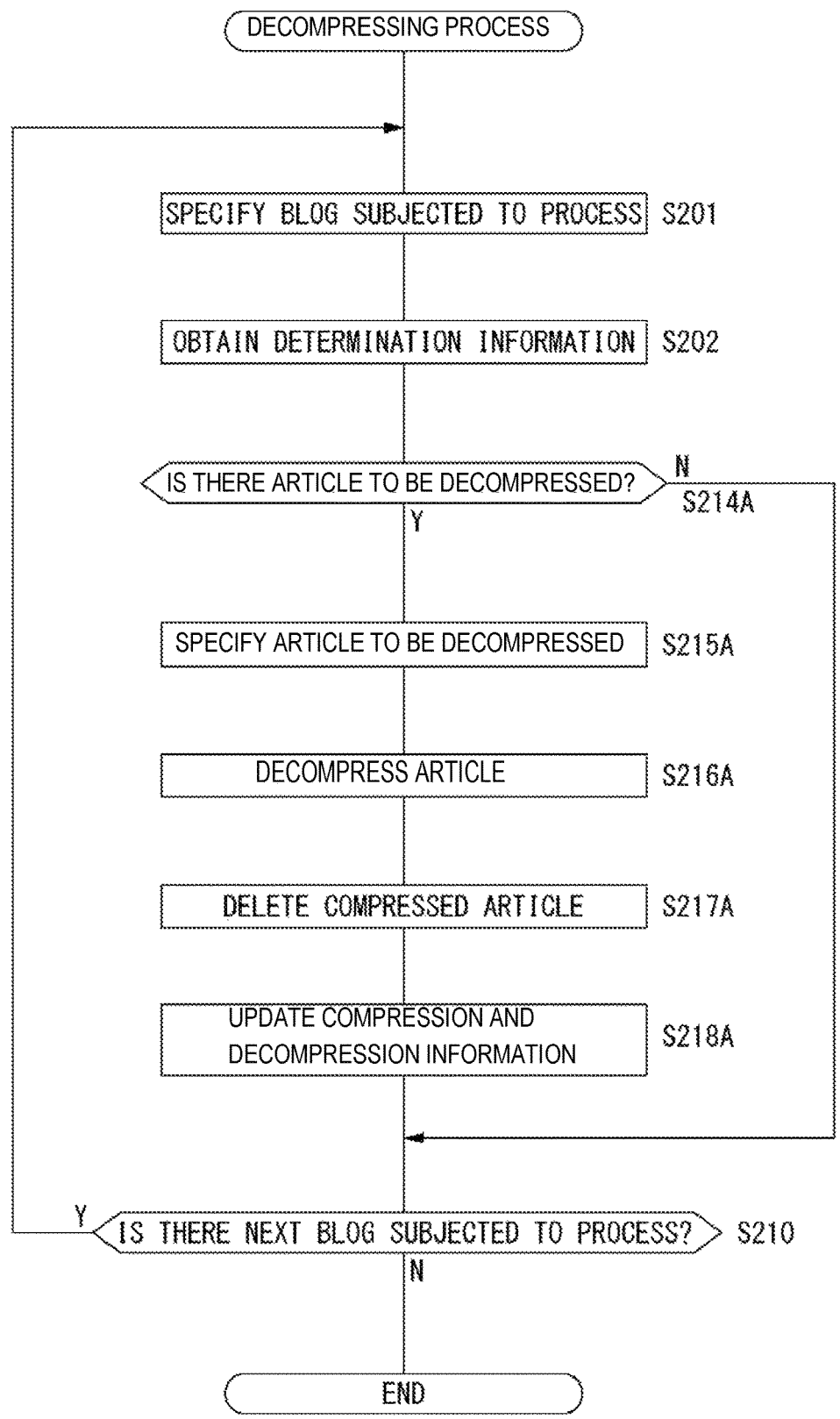
FIG. 16 is a flowchart of a decompressing process according to the sixth embodiment.

Together with this decompression determining process, the blog server 1 executes the decompressing process in FIG. 16 as needed.

The blog server 1 specifies, in the step S201, the blog subjected to the process, and obtains, in the step S202, the determination information.

The blog server 1 refers to, in step S214A, the obtained determination information, and determines whether or not there is the article that should be decompressed among the compressed articles. When there is no article that should be decompressed, the process progresses to the step S210.

When determining that there is one or the plurality of articles that should be decompressed, the blog server 1 specifies, in step S215A, the article to be decompressed, and executes, in step S216A, the decompressing process on the specified one or the plurality of articles. In this case, the decompressed article data is combined with the blog instead of the compressed article so far. Moreover, the blog server 1 deletes, in step S217A, the compressed article. Accordingly, the compressed article in the blog is returned to the decompressed article.

The blog server 1 updates, in step S218A, the compression and decompression information in the managing DB 53. In this case, the flag information is updated so as to indicate that the article that has been decompressed in the blog is in a decompressed status. Moreover, the decompression past-record record is added.

When the decompressing process for one blog completes through the above processes, the blog server 1 checks, in the step S210, whether or not there is the next blog subjected to the process. When there is the next blog, the process returns to the step S201, the other blog subjected to the process is specified, and the same processes are executed.

When the process for all the blogs subjected to the process at this time has been completed, the decompressing process in FIG. 16 from the step S210 is terminated.

The actual decompressing process is executed on the article determined as decompression permitted in the decompression determining process in FIG. 15 through the above processes in FIG. 16.

Hence, the article that contains current-news words, fad words, and a theme for trend, etc., are predicted such that the accessibility thereto will increase, and is decompressed. This eliminates the necessity of the decompressing process when the number of accesses increases later.

9. Seventh Embodiment

According to a seventh embodiment, an example will be described in which, a change in the popularity degree index of the blog is monitored, and when an increasing tendency of the popularity degree index for a given blog is detected, the already-compressed article contained in such a blog is determined as the article to be decompressed. That is, regarding the blog that has an increasing popularity, the compressed article contained in the blog is directly set as the decompression permitted without an individual determination on each article.

Figure 17:
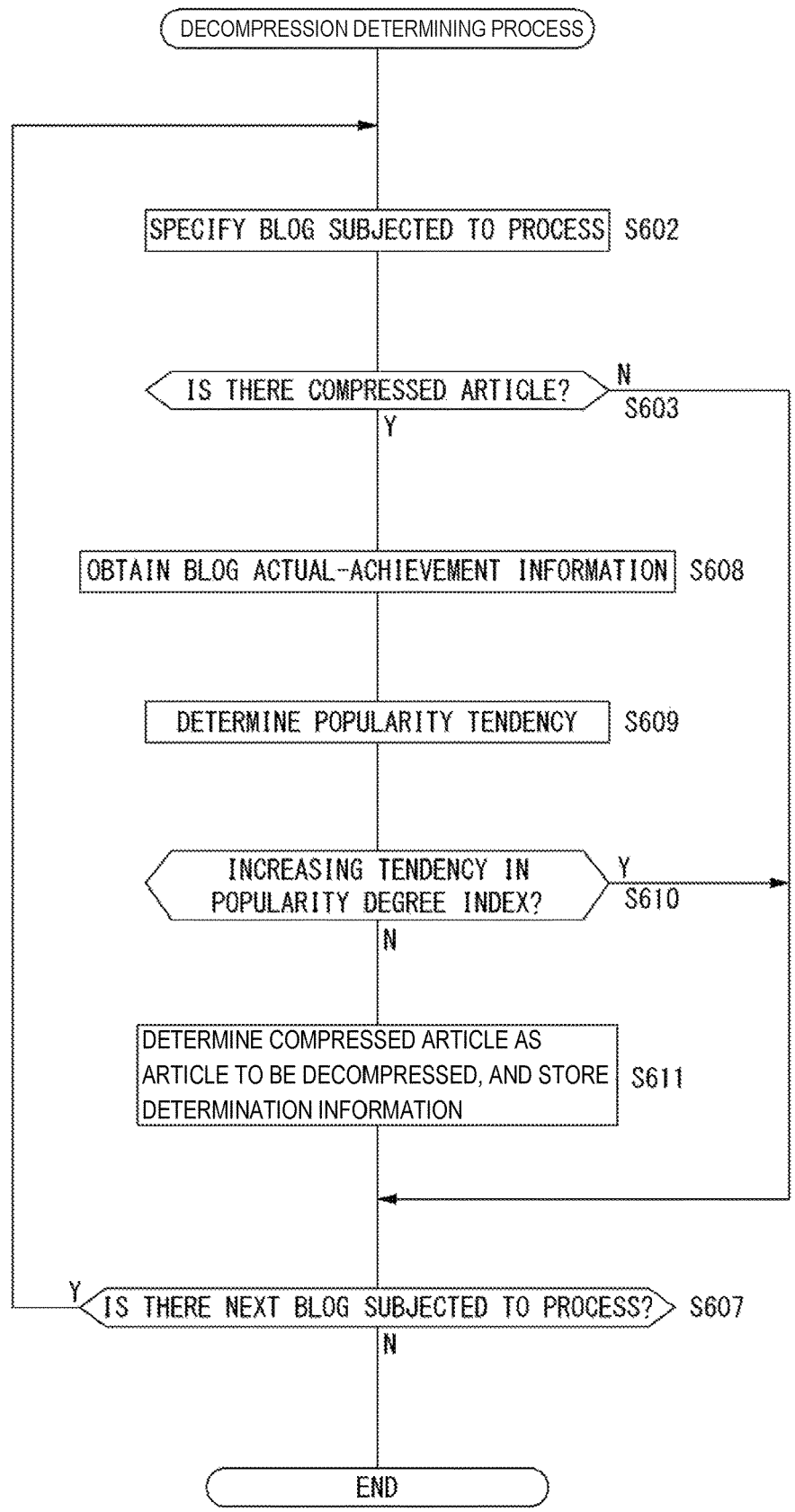
FIG. 17 is a flowchart of a decompression determining process according to a seventh embodiment.

FIG. 17 illustrates the decompression determining process in this case.

The blog server 1 specifies, in step S602, one blog subjected to the process. Next, the blog server refers to, in step S603, the compression and decompression information in the managing DB 53, and checks whether or not there is a compressed article in the specified blog.

When there is no compressed article, since the decompression determination is unnecessary, the process progresses to step S607.

When there is the compressed article in the blog, the blog server 1 progresses the process to step S608, and obtains the blog actual-achievement information on the blog from the managing DB 53.

The blog actual-achievement information obtained in this case is information that indicates the popularity degree index of the blog subjected to the process. For example, information to be adopted as the popularity degree index may be obtained from the pieces of information stored as the blog actual-achievement information, or the information on the popularity degree index calculated from the plural pieces of information may be obtained. Note that in this process, instead of obtaining the popularity degree index, the popularity degree index may be calculated from the plural pieces of information.

It is desirable that the information that indicates the popularity degree index obtained in the step S608 should be information which can be referred as a value for each time period. That is, this is information enabling a determination on a change in popularity.

In the case of, for example, the total number of page views of the blog, the number of accessed unique users, the total linked number, and the total number of comments, etc., the value for each time period, such as day by day, or week by week, is suitable.

Moreover, a value that indicates the increasing tendency of the page view for the entire blog, and a value that indicates the increasing tendency of the data amount for the entire blog may be obtained. Since these values directly reflect a change in popularity, those values are suitable as the information obtained in the step S422.

The blog server 1 determines, in step S609, the popularity tendency of the blog from the above-described popularity degree index. For example, a "popularity increasing tendency", "no change in popularity", "popularity decreasing tendency", etc., are determined. Those can be determined from, for example, the values for each time period, such as the total number of page views and the number of unique users, the increasing tendency and the decreasing tendency of page views. It is appropriate if at least a determination on whether or not the blog has the popularity increasing tendency presently is made.

When determining as "no change in popularity" or "popularity decreasing tendency", the blog server 1 progresses the process to the step S607 from the step S610, and when determining as "popularity increasing tendency", the blog server progresses the process to step S611.

The blog server 1 determines, in the step S611, one or the plurality of compressed articles contained in the blog as all decompression permitted, and stores the determination information, i.e., the information on the article determined as to be decompressed in the managing DB 53.

When the decompression determining process for one blog completes through the above processes, the blog server 1 checks, in the step S607, whether or not there is the next blog subjected to the process. When there is the next blog, the process returns to the step S602, the next blog subjected to the process is specified, and the processes subsequent to the step S603 are executed as described above.

When the process for all the blogs subjected to the process at this time has been completed, the decompression determining process in FIG. 17 607 is terminated from the step S607.

Together with this decompression determining process, the blog server 1 executes the decompressing process in FIG. 16 or the compressing and decompressing process in FIG. 14 as needed. This causes the compressed article in the blog that has an increasing tendency in popularity to be decompressed.

Regarding the blog that has an increasing popularity, since all the articles have the increasing accessibility, the compressed articles are decompressed in advance. This eliminates the necessity of the decompressing process at the time of viewing, and achieves an improvement in response performance and a reduction of a process load at this time.

Note that at the time point that is the step S611 in FIG. 17, the decompression of the compressed article contained in the blog may be executed.

10. Eighth Embodiment

According to an eighth embodiment, an example will be described in which, when the compressed article is decompressed in accordance with an access, the blog server 1 determines, for a predetermined time period after the decompression, that this article is not to be compressed. For example, after the decompression is executed in accordance with an access as described with reference to FIG. 8B or FIG. 8C, when the decompressed article is stored, the compression determining process executed instead of the process in FIG. 5 is applied.

Figure 18:
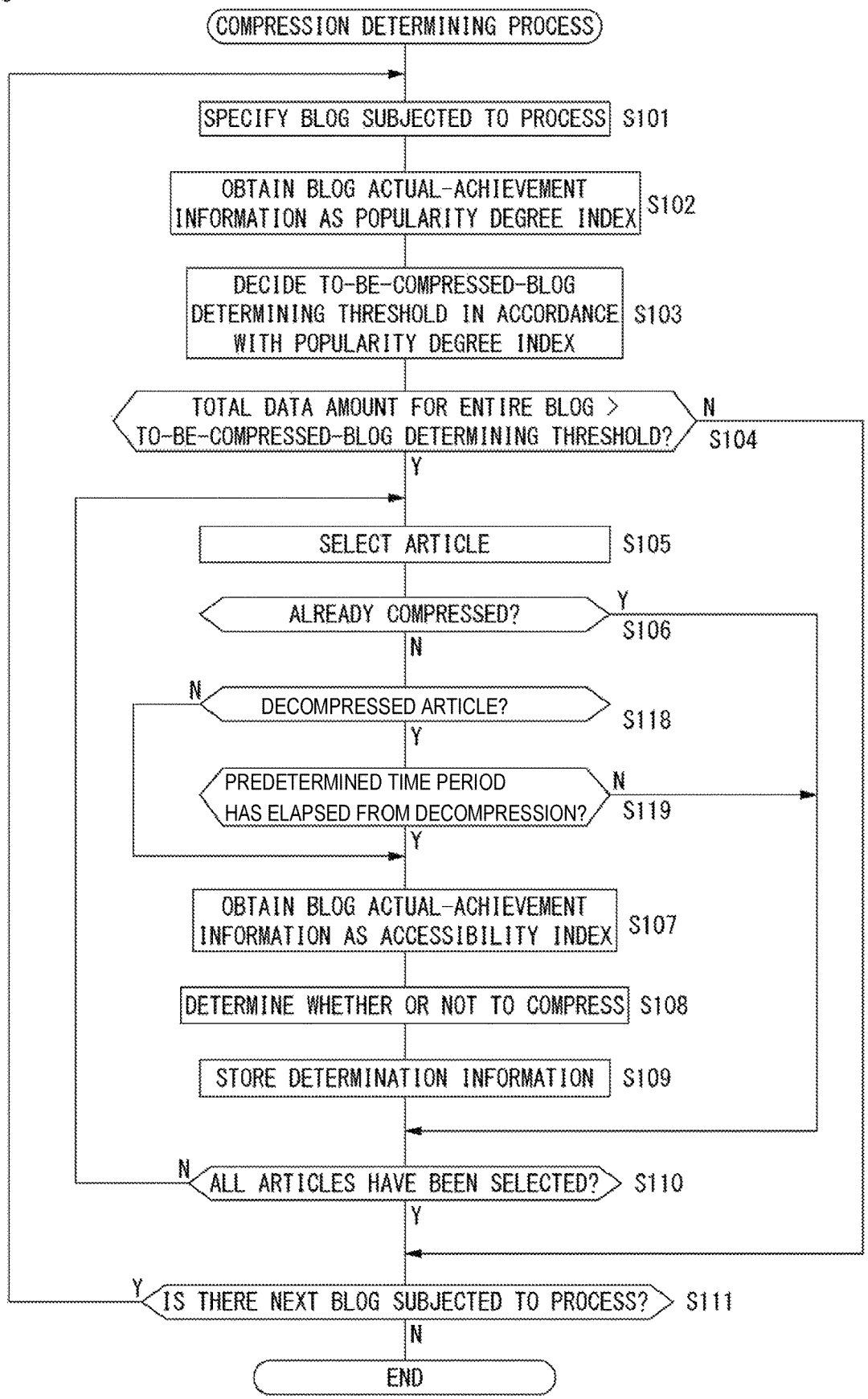
FIG. 18 is a flowchart of a compression determining process according to an eighth embodiment.

FIG. 18 illustrates the compression determining process according to the eighth embodiment. The same step number will be given to the same process as that of FIG. 5, and the duplicated description will be omitted.

In the compression determining process illustrated in FIG. 18, the blog server 1 specifies, in the step S101, the blog, and obtains, in the step S102, the blog actual-achievement information as the popularity degree index. Moreover, the blog server sets, in the step S103, the to-be-compressed-blog determining threshold in accordance with the popularity degree index, and determines, in the step S104, whether or not the total data amount in the blog subjected to the process exceeds the to-be-compressed-blog determining threshold. Accordingly, the server checks whether or not the blog is the blog to be compressed.

Subsequently, the blog server 1 selects, in the step S105, one article, and determines, in the step S106, whether or not the article has been already compressed. When the article has been already compressed, the process transitions to the process in the step S110.

When the article has not been already compressed, the blog server 1 determines, in step S118, whether or not the article is the decompressed article. When the article is not the decompressed article, i.e., when the article is an article in an uncompressed status, the blog server 1 executes the respective processes in steps S107 to S109 on this article.

When the article is the decompressed article, the blog server 1 determines, in step S119, whether or not the predetermined time period has elapsed after the decompression. For example, the decompression date and time of the article is checked, thereby checking whether or not the predetermined time period has passed at the present time point. The predetermined time period is, for example, one month. The check on the decompression date and time is executed with reference to the past-record information in the compression and decompression information in the managing DB 53. Note that in the case of the article having undergone compression and decompression by multiple times, the latest decompression date and time is checked.

Next, when the predetermined time period has elapsed from the decompression, the blog server 1 determines that this article can be compressed again, and executes the respective processes in the steps S107 to S109 on this article. That is, the determination on whether or not to compress in accordance with the accessibility index is made, and the determination information is stored.

In contrast, when the predetermined time period has not been elapsed from the decompression, the blog server 1 does not execute the determination on whether or not this article can be compressed, i.e., the article is treated as not subjected to the compression, and the process progresses to the process in the step S110.

Accordingly, regarding the decompression article that is decompressed once after compressed, the determination with respect to the accessibility is not executed until the predetermined time period has elapsed from the decompression, and such an article is not determined as compression permitted.

Hence, during the predetermined time period after the decompression, when there is an access request, the distribution surely without the execution of the decompressing process is enabled.

Note that the process in the step S118 is based on the determination on whether or not the article is the decompressed article decompressed when the access request is received as illustrated in FIG. 7. Regarding reception of the access request, in addition to the access request received from the user terminal 5 for viewing, for example, an access request by a crawler may be received. The crawler in this case means a program (or an information processing device that executes an operation in accordance with the program) which periodically obtains text data and image data, etc., in various kinds of websites, and automatically constructs a DB. The access request by this crawler does not contribute to a change in popularity degree or in accessibility index for viewing.

Accordingly, when the decompression is executed in accordance with the access request by the crawler, it is desirable to determine in the step S118 that the article is not the decompressed article. That is, in this case, even immediately after the decompression, the article is subjected to the determination on whether or not to compress.

Alternatively, when the decompression is executed in accordance with the access request by the crawler, the decompressed article may be not stored as illustrated in FIG. 8A.

Furthermore, when the access request from the crawler is received, a scheme of not decompressing the compressed article at all is also considerable.

Although the crawler has been described as an example, the accesses other than the access that can be regarded as the intent of the user who is a general audience may be treated like the case of the crawler as described above.

11. Summary and Modified Example

According to the above-described embodiments, the following effects are accomplished. The blog server 1 as the information processing device according to the first to eighth embodiments includes: the popularity degree index obtaining unit 12 that obtains the popularity degree index of the blog which contains one or the plurality of articles; the threshold setting unit 13 that sets the threshold (the to-be-compressed-blog determining threshold) for determining whether or not to compress each blog in accordance with the popularity degree index for each blog; and the determining unit 14 which determines whether or not the blog is a blog to be compressed based on a total data amount of the articles contained in the blog and on the threshold, at least a part of the article contained in the blog to be compressed being to be compressed, and which determines an article to be compressed among the articles contained in the blog to be compressed.

These functions determine whether or not to compress through the processes in FIG. 5, FIG. 12, FIG. 13, and FIG. 18.

When the storage resource for blogs becomes tight, a certain threshold may be set for each blog to compress the article. According to this structure, by determining the blog to be compressed in accordance with a threshold determined based on an index (the popularity degree index) that indicates the popularity of the blog, instead of setting a uniform threshold, the appropriate blog to be compressed is selectable.

It is expected that the article belonging to a popular blog is likely to be requested for access. That is, each article in the popular blog can be regarded as having a higher accessibility than that of each article in an unpopular blog. According to the process of these embodiments, the determination can be made with the popularity of the blog being taken into consideration, and thus the appropriate article to be compressed is selectable.

Moreover, a compression and a decompression to the compression have a high process load, but according to these embodiments, the compression and the decompressing are avoided as much as possible.

When there is an access request to the compressed article, the blog server 1 may decompress and distribute this article, but the article to be compressed for the storage resource is the article that belongs to the blog which has a low accessibility. Hence, an occasion in which the decompressing process is necessary when an access is made can be reduced as much as possible. This decreases the process load on the blog server 1 to provide the blog.

Moreover, by selectively compress the article that has a low accessibility, the load on the compressing process can be reduced.

In view of the foregoing, according to these embodiments, the compression of the article avoids the tight storage resource, and the appropriate article to be compressed is selectable so as to reduce the process occasion, such as compression or decompression, as much as possible. Moreover, the process load on the server can be reduced, and the performance at the time of viewing can be enhanced.

The blog server 1 according to the first to eighth embodiments includes the compressing and decompressing unit 15 which compresses the article to be compressed among the articles that belong to the blog to be compressed, and which decompresses the article when the access request is made to the article that has been already compressed.

That is, the function as the compressing and decompressing unit 15 compresses the article that is appropriately selected in accordance with the determination on the determining unit 14 through the processes illustrated in FIG. 6, FIG. 11, and FIG. 14. Moreover, even if the article is compressed as being determined that the accessibility is low, an access request thereto may sometimes occur. In such a case, however, by executing the decompression through the process in FIG. 7, the article is appropriately presented to the user who has made the access request.

Hence, appropriate compression and decompression can be executed for avoiding a tight storage resource, and for reducing a process load.

The determining unit 14 of the blog server 1 according to the first to eighth embodiments determines, for each article, whether or not the article is to be compressed in accordance with the degree of the accessibility for each article contained in the blog to be compressed, i.e., in accordance with the accessibility index.

By compressing the article that has a low accessibility, a tight storage resource of the server is avoidable. According to such a determining process, in order to compress the article with a low accessibility (e.g., an unpopular article) among the articles contained in the blog, the determination on whether or not the article has a low accessibility is made.

By deciding the blog to be compressed using the index (the accessibility index) which indicates that the accessibility is low, instead of compressing the article based on the index (the popularity degree index) which simply indicates the popularity of the blog, the article that has truly a low accessibility is decided as the article to be compressed. In the case of the article in the popular blog, even if the accessibility is determined as low based on the actual-achievement of the article itself, an access thereto is expected because of a relevance, etc., to the other articles. That is to say, the unpopular article in the popular blog has a higher accessibility than that of the unpopular article in the unpopular blog. According to the process of these embodiments, the determination with not only the popularity of the blog but also the accessibility to the article being taken into consideration can be made. This enables an appropriate selection of the article to be compressed.

Moreover, although the compression and the decompression to the compression have a high process load, according to these embodiments, the compression and the decompression are avoided as much as possible.

When there is an access request to the compressed article, the blog server 1 may decompress and distribute the article, but since the article to be compressed for the storage resource is the article that has truly a low accessibility, an occasion in which the decompressing process is necessary when an access is made is reduced as much as possible. This decreases the process load on the blog server 1 to provide the blog.

Moreover, the selective compression of the article that has truly low accessibility also reduces the load of the compressing process.

As described above, according to this structure, the tightness of the storage resource is suppressed by compressing the article, and the appropriate article to be compressed within the blog is selectable so as to reduce the process opportunities of the compression and the decompression as much as possible. Accordingly, reduction of the process load on the server and enhancement of the performance at the time of viewing are achieved.

The determining unit 14 of the blog server 1 according to the eighth embodiment determines that, when the already-compressed article is decompressed in accordance with the access request, the article is not to be compressed for a predetermined time period from the decompression.

According to the eighth embodiment, when the compressed article is decompressed in accordance with an access request, this article is determined as not to be compressed for the predetermined time period from the decompression (see FIG. 18).

When there is an access after the compression and the article is decompressed and distributed, the article can be regarded that a possibility such that an access request would be made increases. Accordingly, the article is decompressed as it is, eliminating the necessity of the decompressing process when the next access request is received.

However, the access may be sporadic, and the article may be still unpopular. Hence, after the predetermined time period has elapsed, the compression may be made as appropriate based on the popularity degree index of the blog or the accessibility index for each article. This can address a case in which a waste storage resource is consumed by leaving the article as being decompressed, the necessary capacity for storage is reduced, and thus the tightness of the storage resource is avoidable.

The determining unit 14 of the blog server 1 according to the seventh embodiment determines, for the already-compressed article, whether or not to decompress in accordance with the value that indicates the increasing tendency of the page view to the other article in the same blog to be compressed, and the compressing and decompressing unit 15 decompresses the article in accordance with the determination on whether or not to decompress.

According to the seventh embodiment, a change in popularity degree index of the blog is monitored, and when the increasing tendency of the popularity degree index is detected for a given blog, the determination that the already-compressed article contained in this blog is the article to be decompressed (see FIG. 17).

When the number of accesses to a given blog remarkably increases because of a certain popular article, the other articles contained in this blog have an increasing accessibility in future although not accessed so far. Hence, all the compressed articles in the blog are determined as the articles to be decompressed.

This eliminates the necessity of the decompressing process at a time point at which the actual access is made, and enables a distribution of the article with an excellent response performance.

Note that as a modified example of the process in FIG. 17 according to the seventh embodiment, not all the compressed articles but some compressed articles in the blog determined as the popularity increasing may be determined as the articles to be decompressed. When, for example, the article that has the posted date and time within a predetermined time period in past from the present moment is determined as the article to be decompressed, the large number of articles are not decompressed immoderately, thus suitable to maintain the storage resource. For example, regarding the blog which has a large number of articles posted for a long time, and which has a large number of compressed articles that are relatively old, it is preferable that not all the compressed articles but some compressed articles should be determined as the articles to be decompressed.

Alternatively, when the number of compressed articles is equal to or greater than a predetermined number, only some (e.g., a half) articles may be determined as the articles to be decompressed.

Moreover, when the upper limit of the number of articles to be decompressed is set and there are the compressed articles beyond the upper limit, the articles up to the upper limit number may be determined as the article to be decompressed from the article that has a newer posted date and time.

The determining unit 14 of the blog server 1 according to the sixth embodiment determines whether or not to decompress the already-compressed article based on the contents of the article.

According to the sixth embodiment, the determination on whether or not to decompress the already-compressed article is made based on the contents of the article (see FIG. 15).

For example, as the contents of the compressed article, the article that contains a certain set keyword or current-news word, the article with a specific theme, etc., are picked out, and these articles are determined as the articles to be decompressed.

For example, regarding a blog article that mentions a certain theme, although such an article is not getting attention a lot at a time point at which the article is uploaded, the possibility such that the article is searched increases (i.e., the accessibility increases) few years later because any incident or event relating to the theme mentioned in the article occurs in the world, and the linked number to the article increases.

Accordingly, such a tide is perceived in advance based on the contents of the article, more specifically, the current-news word, the set keyword, and the theme etc., of the article, and the article which has been already compressed but which has an increasing accessibility is decompressed from the compressed status.

This eliminates the necessity of the decompressing process at the time point at which the actual access is made, enabling a prompt distribution of the article.

Note that regarding the compressed article, it becomes difficult to search the contents. Accordingly, the managing DB 53 stores the tag information as the compressed article tag that indicates a keyword and a theme, etc. This facilitates and enables an appropriate decompressing determination.

Moreover, tag setting and the tag registration in the managing DB 53 are executed at the time of the compression (see FIG. 6, FIG. 11, and FIG. 14). This causes the execution of the processes of setting and registering the tag to be minimum requisite. Hence, an increase in process load is suppressed, and the waste consumption of the storage resource in the DB immoderately is avoided.

The example processes in the above-described embodiments are merely examples, and other various kinds of modified examples are expectable.

When the popularity degree of the blog is classified into, for example, equal to or greater than three classifications, regarding the blog that is determined as having the popularity in the lowest ranking, all the articles may be determined as compression permitted. That is, this is an example in which the determination on whether or not to compress is made for each article based on the popularity degree index and on the accessibility index with respect to a popularity between a first level (popularity high) and an (n−1)-th level (popularity low) with the popularity degree being classified into n classes. For the blog in an n-th level (popularity lowest), however, all the articles are determined as compression permitted without a determination on individual article.

In particular, as for the blog which has no access (viewing and comment writing) of an audience, and which has no update by the describer for a long time, such a blog can be regarded as substantially not utilized at all. Such a blog may be determined as the blog with the lowest popularity as described above.

This improves the process efficiency of the blog server 1, reduces the process load, and ensures the storage resource.

The compressing process may be executed multiple times step by step.

For example, the determination on the accessibility is still made on the compressed article as illustrated in FIG. 13. Next, the article which has been already compressed and which has no access for a predetermined time period may be compressed at a higher compression percentage.

For example, in the first-time compression, the compression is executed with the compression percentage that is 20%, in the second-time compression, the compression is executed with the compression percentage that is 50%, and in the third-time compression, the compression is executed with the compression percentage that is 80%.

Moreover, there is also an example in which the first-time compression is a lossless compression, and the second-time compression is a lossy compression.

Furthermore, the first-time compression may be a partial compression on the article, and the second-time compression may be an entire compression on the article.

Still further, the first-time compression may be a compression on only the text in the article, and the second-time compression may be a compression on the image in addition to the text.

Yet still further, the first-time compression may be a compression on only the image in the article, and the second-time compression may be a compression on the text in addition to the image.

Some blogs may be excluded from the blog subjected to the compression determining process.

For example, regarding the blog that is determined as highly popular for a long time, the article contained in this blog may be excluded from the article subjected to the compression determination. This reduces the number of blogs subjected to the processes as illustrated in FIG. 5, FIG. 12, FIG. 13, and FIG. 18, etc., making the process efficient.

Similarly, the blog determined that all the articles have been already compressed, in particular, determined as quite unpopular (substantially not utilized at all) as described above may be excluded from the blog subjected to the decompression determination. This reduces the number of blogs subjected to the processes as illustrated in FIG. 13, FIG. 15, and FIG. 17, etc., and making the process efficient.

Note that in the above-described embodiments, the process which is for a so-called blog and an article contained in the blog, and which compresses the article has been described. Such a technology is applicable to a folder in a file system and a file contained in the folder.

That is, the popularity degree index for the folder is converted into a value based on whether or not the folder is frequently utilized, and a determination on which such a value is reflected is made on whether or not the file is to be compressed with reference to the accessibility of the file.

Moreover, the blog may be a system achieved as a so-called cloud storage.

12. Program and Storage Medium

A program according to an embodiment causes an information processing device (a CPU, etc.,) to execute the processes of at least the popularity degree index obtaining unit 12, the threshold setting unit 13, and the determining unit 14 of the blog server 1.

The program according to the embodiment causes an information processing device to execute: a popularity degree index obtaining function that obtains a popularity degree index of a blog which contains one or a plurality of articles; a threshold setting function that sets a threshold for determining, for each blog, whether or not to compresses in accordance with the popularity degree index for each blog; and a determining function which determines whether or not the blog is a blog to be compressed based on a total data amount of the articles contained in the blog and on the threshold, at least a part of the article contained in the blog to be compressed being to be compressed, and which determines an article to be compressed among the articles contained in the blog to be compressed.

That is, this program causes the information processing device to execute the processes described with reference to FIG. 5, FIG. 12, FIG. 13, and FIG. 18, etc.

Such a program enables an achievement of one or a plurality of the information processing devices as the above-described blog server 1.

Moreover, such a program may be stored in advance in an HDD that is a storage medium built in an apparatus like a computer apparatus, a ROM in a microcomputer that has a CPU, or the like. Alternatively, the program may be temporarily or permanently recorded (stored) in a removable storage medium, such as a semiconductor memory, a memory card, an optical disk, a magneto-optical disc, or a magnetic disk. Furthermore, such a removable storage medium can be provided as a so-called package software.

Still further, such a program may be installed in a personal computer, etc., from the removable storage medium, and also downloadable via a network, such as a LAN or the Internet, from a download site.

REFERENCE SIGNS LIST

1 Blog server, 2 Network, 5 User terminal, 11 Blog managing unit, 12 Popularity degree index obtaining unit, 13 Threshold setting unit, 14 Determining unit, 15 Compressing and decompressing unit, 51 Blog DB, 52 Image DB, 53 Managing DB

The invention claimed is:

1. An information processing device comprising:
at least one memory configured to store computer program code;
at least one processor configured to access said computer program code and operate as instructed by said computer program code, said computer program code including:
popularity degree index obtaining code configured to cause at least one of said at least one processor to obtain a popularity degree index of a blog which contains at least one article;
threshold setting code configured to cause at least one of said at least one processor to set a threshold for determining whether or not to compress each blog in accordance with the popularity degree index for each blog; and
determining code configured to cause at least one of said at least one processor to determine, whether or not the blog is a blog to be compressed based on a total data amount of the at least one article contained in the blog and on the threshold, at least a part of the article contained in the blog to be compressed being to be compressed, and to determine an article to be compressed among the at least one article contained in the blog to be compressed.

2. The information processing device according to claim 1, further comprising:
compressing and decompressing code configured to cause at least one of said at least one processor to compress the article to be compressed among the at least one article that belongs to the blog to be compressed, and to decompress the article when an access request is made to the article that has been already compressed.

3. The information processing device according to claim 1, wherein
the determining code is configured to cause at least one of said at least one processor to determine, for each article, whether or not the article is to be compressed in accordance with a degree of an accessibility for each article contained in the blog to be compressed.

4. The information processing device according to claim 2, wherein
the determining code is configured to cause at least one of said at least one processor to determine that, when the already-compressed article is decompressed in accordance with an access request, the article is not to be compressed for a predetermined time period from the decompression.

5. The information processing device according to claim 2, wherein:
the determining code is configured to cause at least one of said at least one processor to determine, for the already-compressed article, whether or not to decompress in accordance with a value that indicates an increasing tendency of a page view to the other article in the same blog to be compressed; and
the compressing and decompressing code is configured to cause at least one of said at least one processor to decompress the article in accordance with the determination on whether or not to decompress.

6. The information processing device according to claim 1, wherein
the determining code is configured to cause at least one of said at least one processor to determine whether or not to decompress the already-compressed article based on contents of the article.

7. The information processing device according to claim 1, wherein
the popularity degree index is a value obtained base on at least one of the followings: a total number of page views for the entire blog; a number of page views for each article; a number of unique users who have accessed the blog; a total linked number set for the blog; a total number of comments posted on the blog; a number of unique users who have posted comments on the blog; a value that indicates a page ranking of the blog; a length of a time period at which there is no access request to the blog; a total number of page views for the entire blog within a predetermined time period; a value that indicates an increasing tendency of the page views for the entire blog; a value that indicates a blog updating frequency; a number of clicks to an advertisement provided on the blog page; and a value that indicates an increasing tendency of the data amount for the entire blog.

8. An information processing method executed by an information processing device, the method comprising:

obtaining a popularity degree index of a blog which contains at least one article;

setting a threshold for determining whether or not to compress each blog in accordance with the popularity degree index for each blog;

determining whether or not the blog is a blog to be compressed based on a total data amount of the at least one article contained in the blog and on the threshold, at least a part of the article contained in the blog to be compressed being to be compressed; and determining an article to be compressed among the at least one article contained in the blog to be compressed.

9. A non-transitory computer readable storage medium having stored thereon a computer program configured to cause an information processing device to:

obtain a popularity degree index of a blog which contains at least one article;

set a threshold for determining, for each blog, whether or not to compresses in accordance with the popularity degree index for each blog;

determine, whether or not the blog is a blog to be compressed based on a total data amount of the at least one article contained in the blog and on the threshold, at least a part of the article contained in the blog to be compressed being to be compressed; and determine an article to be compressed among the at least one article contained in the blog to be compressed.

* * * * *